US012682762B2

(12) United States Patent　　(10) Patent No.:　US 12,682,762 B2
Uoshita　　(45) Date of Patent:　　Jul. 14, 2026

(54) NAVIGATION PLANNING SYSTEM AND NAVIGATION PLANNING METHOD

(71) Applicant: Furuno Electric Co., Ltd., Nishinomiya-City (JP)

(72) Inventor: Seiichi Uoshita, Nishinomiya-City (JP)

(73) Assignee: FURUNO ELECTRIC CO., LTD., Nishinomiya-City (JP)

(*) Notice: Subject to any disclaimer, the term of this patent is extended or adjusted under 35 U.S.C. 154(b) by 48 days.

(21) Appl. No.: 18/820,420

(22) Filed: Aug. 30, 2024

(65) Prior Publication Data

US 2025/0252854 A1　　Aug. 7, 2025

(30) Foreign Application Priority Data

Feb. 2, 2024　(JP) ................................. 2024-015218

(51) Int. Cl.
　*G08G 3/02*　　　(2006.01)
　*B63B 49/00*　　(2006.01)
　*G01C 21/20*　　(2006.01)
　*G01S 13/58*　　(2006.01)
(52) U.S. Cl.
　CPC .............. *G08G 3/02* (2013.01); *B63B 49/00* (2013.01); *G01C 21/20* (2013.01); *G01C 21/203* (2013.01); *G01S 13/58* (2013.01)
(58) Field of Classification Search
　None
　See application file for complete search history.

(56) References Cited

U.S. PATENT DOCUMENTS

| | | | |
|---|---|---|---|
| 2016/0101838 A1* | 4/2016 | Kojima | B63B 49/00 |
| | | | 701/466 |
| 2020/0089239 A1* | 3/2020 | Navarro | G06Q 50/40 |
| 2020/0310434 A1 | 10/2020 | Chung et al. | |

(Continued)

FOREIGN PATENT DOCUMENTS

| | | |
|---|---|---|
| JP | 2016-080432 A | 5/2016 |
| JP | 2024-007541 A | 1/2024 |
| KR | 10-2099699 B1 | 4/2020 |

OTHER PUBLICATIONS

Partial European search report issued on Feb. 20, 2025, in corresponding European patent Application No. 24196166.3, 13 pages.

*Primary Examiner* — Vivek D Koppikar
*Assistant Examiner* — David Ruben Pedersen
(74) *Attorney, Agent, or Firm* — XSENSUS LLP

(57)　　ABSTRACT

A navigation planning system and method can comprise: acquiring a planned route indicating a navigation planning route of a movable body on a water; acquiring movable body information including a position, a moving direction, and a speed of the movable body; acquiring obstacle information including a position, a moving direction, and a speed of one or a plurality of obstacles around the movable body; and calculating a collision risk value indicating a risk level of collision between the movable body and an obstacle from the plurality of obstacles based on the movable body information and the obstacle information, and determining necessity of evasion based on the collision risk value and a threshold value. In the case of necessity of evasion, the system can set an evasion route whose end point is not on the planned route and whose direction at the end point is in a predetermined direction.

19 Claims, 38 Drawing Sheets

(56)               References Cited

U.S. PATENT DOCUMENTS

| | | | |
|---|---|---|---|
| 2021/0125502 A1* | 4/2021 | Mansor | G06N 3/0499 |
| 2022/0036738 A1* | 2/2022 | Liu | G06F 18/214 |
| 2023/0186774 A1* | 6/2023 | Ando | B63B 49/00 |
| | | | 340/984 |
| 2023/0406461 A1 | 12/2023 | Uoshita | |

* cited by examiner

1000

| Potential evasive route | Collision risk value | Pass length of evasive route | Evasive traveling distance | Select result |
|---|---|---|---|---|
| A | 0.81 | 1.42 | 3.20 | Risky |
| B | 0.72 | 2.37 | 4.31 | Risky |
| ... | ... | ... | ... | ... |
| D | 0.30 | 1.35 | 2.63 | Safe, but too far away |
| E | 0.35 | 0.75 | 2.85 | Selected (Optimistic) |
| F | 0.39 | 0.50 | 1.76 | Relatively Risky |
| ... | ... | ... | ... | ... |

FIG. 10

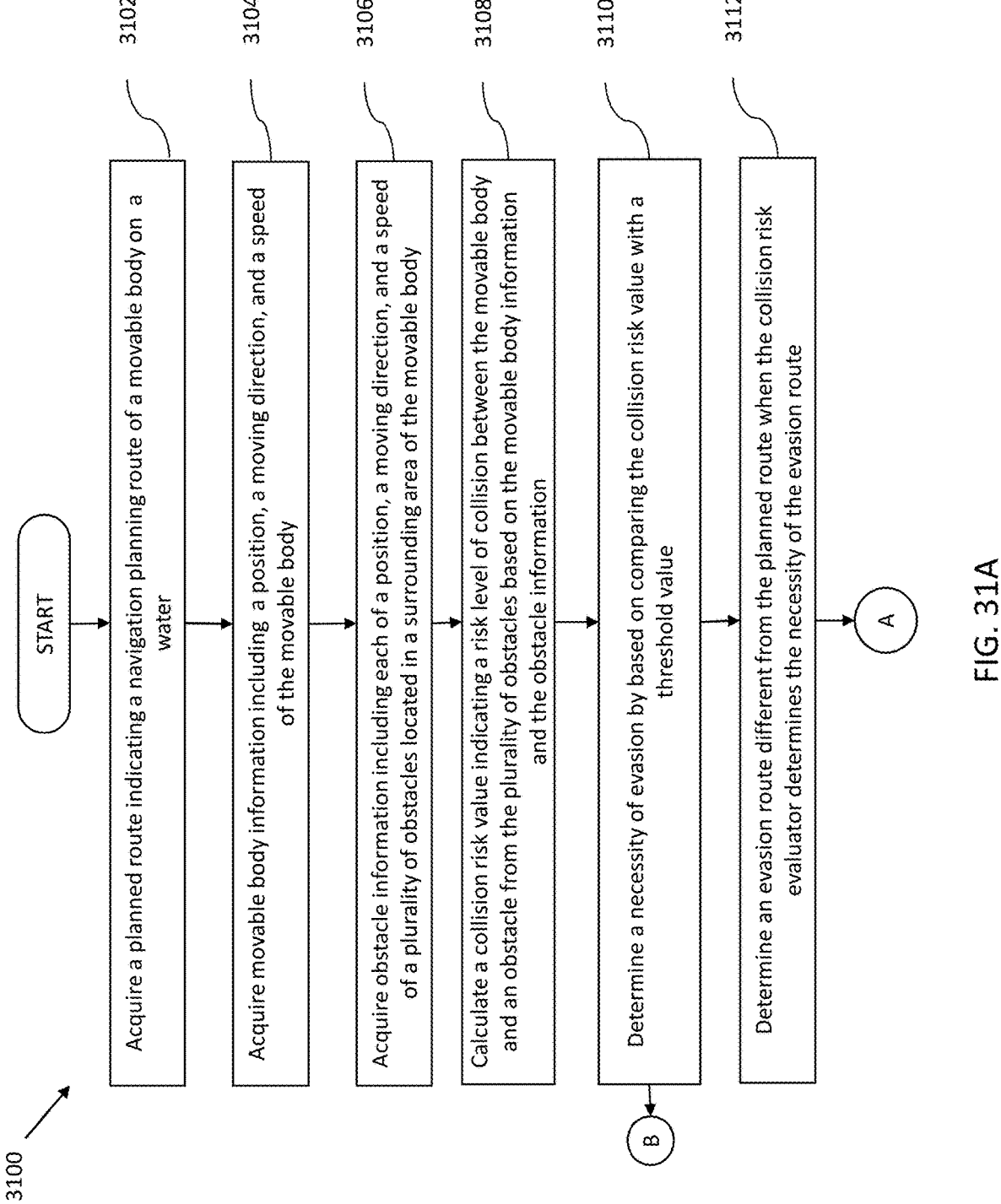

3100

START

Acquire a planned route indicating a navigation planning route of a movable body on a water — 3102

Acquire movable body information including a position, a moving direction, and a speed of the movable body — 3104

Acquire obstacle information including each of a position, a moving direction, and a speed of a plurality of obstacles located in a surrounding area of the movable body — 3106

Calculate a collision risk value indicating a risk level of collision between the movable body and an obstacle from the plurality of obstacles based on the movable body information and the obstacle information — 3108

Determine a necessity of evasion by based on comparing the collision risk value with a threshold value — 3110

Determine an evasion route different from the planned route when the collision risk evaluator determines the necessity of the evasion route — 3112

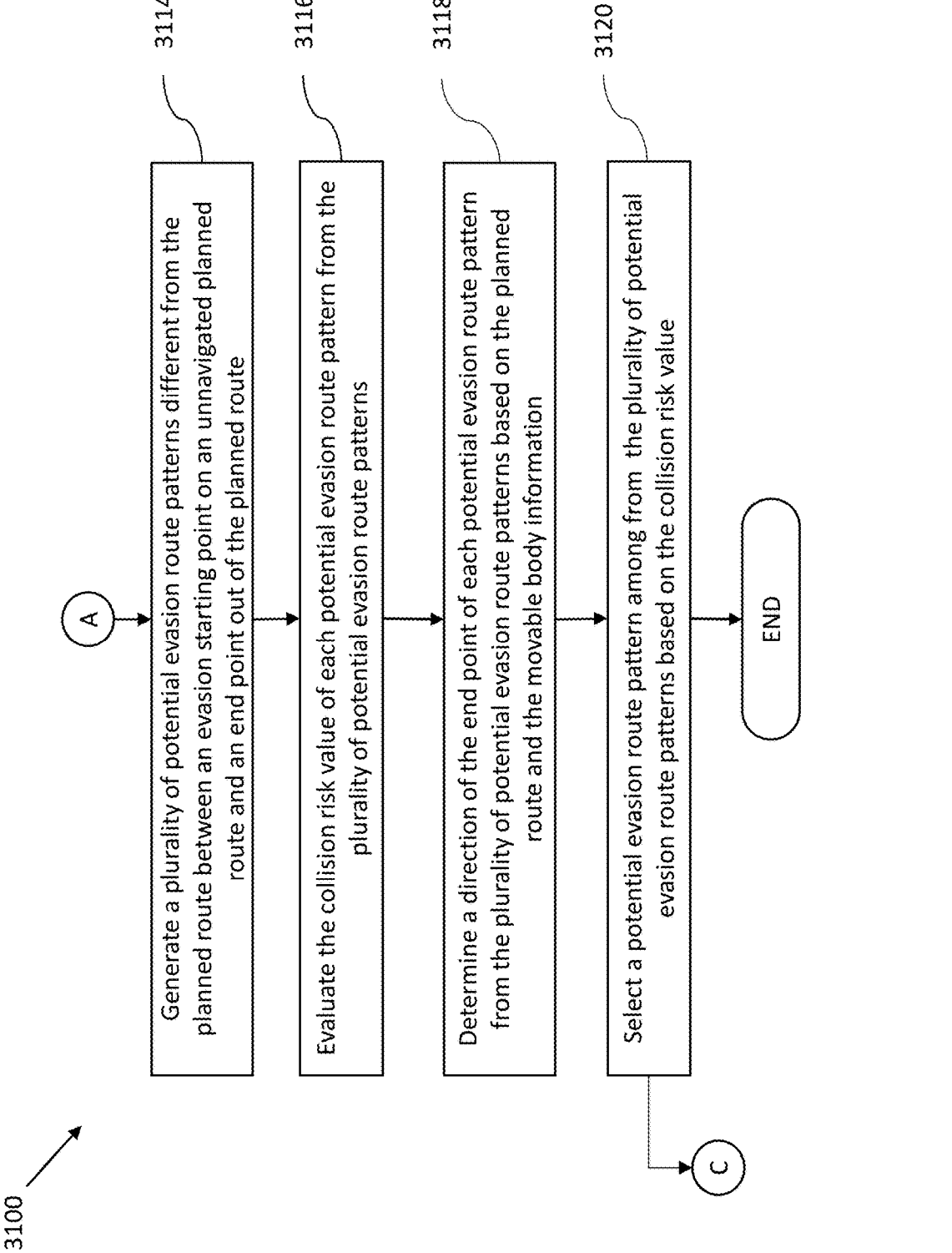

3100

A

Generate a plurality of potential evasion route patterns different from the planned route between an evasion starting point on an unnavigated planned route and an end point out of the planned route  — 3114

Evaluate the collision risk value of each potential evasion route pattern from the plurality of potential evasion route patterns  — 3116

Determine a direction of the end point of each potential evasion route pattern from the plurality of potential evasion route patterns based on the planned route and the movable body information  — 3118

Select a potential evasion route pattern among from the plurality of potential evasion route patterns based on the collision risk value  — 3120

END

3122 — Select a maximum collision risk obstacle corresponding to a maximum collision risk value among from the plurality of obstacles 3124 — Compare the maximum collision risk value with a maximum collision risk threshold value 3126 — Determine the necessity of evasion based on the collision risk

B

A

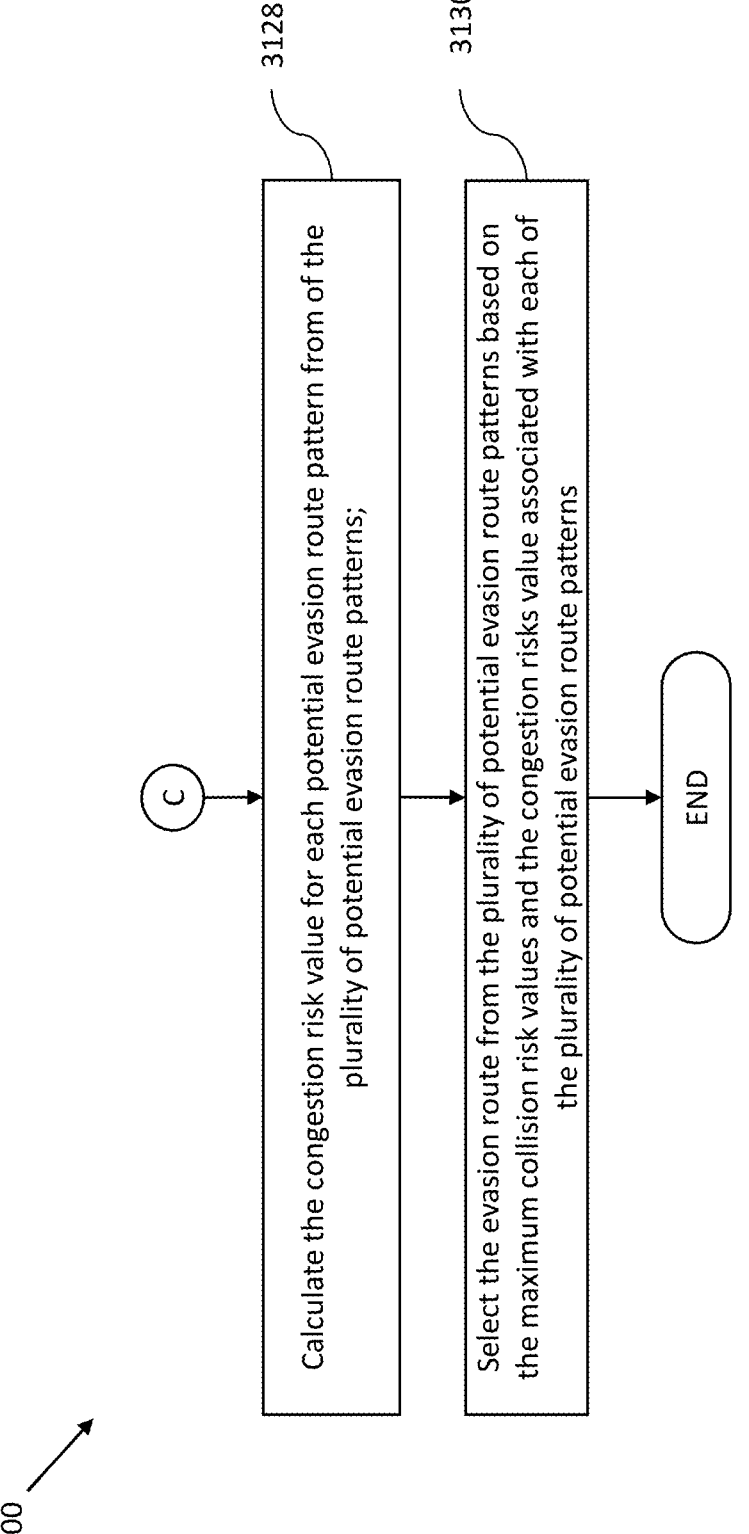

3100

3128

Calculate the congestion risk value for each potential evasion route pattern from of the plurality of potential evasion route patterns;

3130

Select the evasion route from the plurality of potential evasion route patterns based on the maximum collision risk values and the congestion risks value associated with each of the plurality of potential evasion route patterns

END

FIG. 31D

NAVIGATION PLANNING SYSTEM AND NAVIGATION PLANNING METHOD

CROSS-REFERENCE TO RELATED APPLICATION

This application claims priority to Japanese Patent Application No. 2024-015218 filed on Feb. 2, 2024. The entire disclosure of Japanese Patent Application No. 2024-015218 is hereby incorporated herein by reference.

BACKGROUND

Technical Field

The present disclosure mainly relates to a marine navigation system for safely navigating a ship, and more specifically to a navigation route planning apparatus and method for safely navigating a ship by avoiding collisions with surrounding obstacles.

Description of the Related Art

In general, a movable body, such as vessel or ship, sets a planned route for navigation from a departure or source location to a destination location before initiating the navigation. Currently, the movable body may include navigation systems and devices for generating a planned route and monitoring the planned route for safely navigating the movable body. Additionally, these conventional navigation systems and devices use a plurality of sensor modules for acquiring movable body information and obstacle information in order to track and identify a position of the nearby obstacles and other ships including the movable body (or own ship) on the planned route for avoiding collisions.

However, during navigation on the planned route, there may be scenarios where the planned route has to be changed due to artificial factors, such as appearance of the nearby obstacles and other ships that may cross the planned route. In addition, natural factors, such as sudden changes in oceanographic conditions, tides, and other external disturbance factors may force a change in a navigation route from the planned route. Thus, the vessel navigating personnel might need assistance to navigate through the oceanographic conditions and tides in such a manner as to avoid collision with nearby obstacles or ships and safely navigate the movable body, such as vessel, along the planned route. For the reasons, there is a need for providing a system and method that assists the vessel navigating personnel to safely navigate the movable body by avoiding the collisions with the obstacles and other ships.

SUMMARY

In an embodiment of the present disclosure, there is provided a navigation planning system. The navigation planning system includes processing circuitry that is configured to acquire a planned route indicating a navigation planning route of a movable body on a water. Further, the processing circuitry is configured to acquire movable body information including a position, a moving direction, and a speed of the movable body. Furthermore, the processing circuitry is configured to acquire obstacle information including a position, a moving direction, and a speed of a plurality of obstacles located in a surrounding area of the movable body. The processing circuitry is further configured to calculate a collision risk value indicating a risk level of collision between the movable body and an obstacle from the plurality of obstacles based on the movable body information and the obstacle information. Subsequently, the processing circuitry is configured to determine a necessity of evasion based on comparing the collision risk value with a threshold value. Finally, the processing circuitry is configured to set an evasion route different from the planned route when the necessity of the evasion is determined. The movable body is oriented in a reference direction at an end point of the evasion route.

Additionally, or optionally, the processing circuitry is further configured to determine a direction of the end point of each potential evasion route pattern from the plurality of potential evasion route patterns based on the planned route and the movable body information.

Additionally, or optionally, the reference direction of the end point of each potential evasion route pattern from the plurality of potential evasion route patterns may be parallel to a direction of the movable body at a position where the movable body begins to deviate from the planned route, or parallel to a direction at a selected point on the unnavigated planned route. The reference direction of the end point of each potential evasion route pattern from the plurality of potential evasion route patterns may be toward a destination from the position where the movable body begins to evade, or toward the selected point on the unnavigated planned route from the position where the movable body begins to evade.

Additionally, or optionally, the processing circuitry is further configured to generate a plurality of potential evasion route patterns different from the planned route between an evasion starting point on an unnavigated planned route and the end point out of the planned route. Further, the processing circuitry is configured to evaluate the collision risk value of each potential evasion route pattern from the plurality of potential evasion route patterns. Furthermore, the processing circuitry is configured to select a potential evasion route pattern from the plurality of potential evasion route patterns based on the collision risk value. The potential evasion route pattern is the evasion route for the movable body.

Additionally, or optionally, the processing circuitry is further configured to select a potential evasion route pattern having the minimum collision risk.

Additionally, or optionally, the processing circuitry is further configured to generate one or a plurality of potential evasion route patterns different from the planned route between an evasion starting point on an unnavigated planned route and the end point out of the planned route and evaluate the collision risk of each potential evasion route pattern from the plurality of potential evasion route patterns. Further, the processing circuitry is configured to calculate the distance between the evasion starting point and the end point along each potential evasion route and select a potential evasion route pattern from the plurality of potential evasion route patterns based on the collision risk and the distance, wherein the potential evasion route pattern is the evasion route for the movable body.

Additionally, or optionally, the processing circuitry is further configured to extract a maximum collision risk obstacle corresponding to a maximum collision risk value from the plurality of obstacles including each potential evasion route pattern and select one or a plurality of the potential evasion route pattern, wherein each maximum collision risk value of the maximum collision risk obstacle is below a collision risk threshold value. Further, the processing circuitry is configured to select a potential evasion route pattern from the selected plurality of potential evasion route patterns, based on the collision risk and the distance.

Additionally, or optionally, the processing circuitry is configured to calculate a congestion risk value indicating a degree of approaching the plurality of obstacles simultaneously based on the collision risk value between the movable body and each obstacle from the plurality of obstacles. Further, the processing circuitry is configured to determine the necessity of evasion based on the collision risk value and the congestion risk value.

Additionally, or optionally, the processing circuitry is further configured to calculate the congestion risk value of the planned route based on the a logical sum of a plurality of collision risk values associated with the plurality of obstacles.

Additionally, or optionally, the processing circuitry is further configured to calculate the congestion risk value based on the plurality of collision risk values excluding the maximum collision risk value and including a second large collision risk value among the plurality of collision risk values.

Additionally, or optionally, the processing circuitry is further configured to generate one or a plurality of potential evasion route patterns different from the planned route between an evasion starting point on an unnavigated planned route and the end point out of the planned route. Further the processing circuitry is configured to evaluate the collision risk of each potential evasion route pattern from the plurality of potential evasion route patterns and evaluate the congestion risk of each potential evasion route pattern from the plurality of potential evasion route patterns. The processing circuitry is further configured to select a potential evasion route pattern from the plurality of potential evasion route patterns based on the collision risk and the congestion risk.

Additionally, or optionally, the processing circuitry is further configured to extract a maximum collision risk obstacle corresponding to a maximum collision risk value from the plurality of obstacles including each potential evasion route pattern and select one or a plurality of the potential evasion route pattern, wherein each maximum collision risk value of the maximum collision risk obstacle is below a collision risk threshold value. Furthermore, the processing circuitry select a potential evasion route pattern from the selected plurality of potential evasion route patterns, based on the collision risk and the congestion risk.

Additionally, or optionally, the processing circuitry is further configured to extract a maximum collision risk obstacle corresponding to a maximum collision risk value from the plurality of obstacles including each potential evasion route pattern and select one or a plurality of the potential evasion route pattern, wherein each maximum collision risk value of the maximum collision risk obstacle is below a collision risk threshold value. Further, the processing circuitry is configured to calculate the distance between the evasion starting point and the end point along each potential evasion route and select a potential evasion route pattern from the plurality of potential evasion route patterns based on the collision risk, the congestion risk, and the distance, wherein the potential evasion route pattern is the evasion route for the movable body.

Additionally, or optionally, the processing circuitry is further configured to release a restriction on the direction of the end point of the evasion route and set a new evasion route having the collision risk value below a collision risk threshold value and the congestion risk value below a congestion risk threshold value, when there is no evasion route having the collision risk value and the congestion risk value below the congestion risk threshold value.

Additionally, or optionally, the processing circuitry is further configured to select the evasion route from the plurality of potential evasion rote patterns in which a distance traveled by the movable body is minimum among the plurality of potential evasion route patterns, and the maximum collision risk value and the congestion risk value are equal to or less than the threshold value.

Additionally, or optionally, the processing circuitry is configured to periodically acquire the movable body information, periodically acquire the obstacle information, periodically calculate the collision risk value, periodically determine the necessity of the evasion, and periodically set the evasion route when the necessity of the evasion is determined.

In another aspect of the present disclosure, there is provided a navigation planning method. The navigation planning method includes acquiring a planned route indicating a navigation planning route of a movable body on a water. The navigation planning method further includes acquiring movable body information including a position, a moving direction, and a speed of the movable body. Further, the navigation planning method includes acquiring obstacle information including a position, a moving direction, and a speed of a plurality of obstacles located in a surrounding area of the movable body. Furthermore, the navigation planning method includes calculating a collision risk value indicating a risk level of collision between the movable body and an obstacle from the plurality of obstacles based on the movable body information and the obstacle information. Subsequently, the navigation planning method includes determining a necessity of evasion based on comparing the collision risk value with a threshold value. Finally, the navigation planning method includes setting an evasion route different from the planned route when the necessity of the evasion is determined. The movable body is oriented in a reference direction at an end point of the evasion route.

Additionally, or optionally, the reference direction of the end point of each potential evasion route pattern from the plurality of potential evasion route patterns may be parallel to a direction of the movable body at a position where the movable body begins to deviate from the planned route, parallel to a direction at a selected point on the unnavigated planned route, toward a destination from the position where the movable body begins to evade, or toward the selected point on the unnavigated planned route from the position where the movable body begins to evade.

Additionally, or optionally, the navigation planning method further comprises generating one or a plurality of potential evasion route patterns different from the planned route between an evasion starting point on an unnavigated planned route and the end point out of the planned route, evaluate the collision risk of each potential evasion route pattern from the plurality of potential evasion route patterns, and selecting a potential evasion route pattern from the plurality of potential evasion route patterns based on the collision risk, wherein the potential evasion route pattern is the evasion route for the movable body.

In yet another aspect of the present disclosure, there is provided a non-transitory computer readable medium having stored thereon computer-executable instructions which, when executed by a computer, cause the computer to acquire a planned route indicating a navigation planning route of a movable body on a water, acquire movable body information including a position, a moving direction, and a speed of the movable body, acquire obstacle information including a position, a moving direction, and a speed of a plurality of obstacles located in a surrounding area of the movable body, calculate a collision risk value indicating a risk level of collision between the movable body and an obstacle from the plurality of obstacles based on the movable body information and the obstacle information, determine a necessity of evasion based on comparing the collision risk value with a threshold value, and set an evasion route different from the planned route when the necessity of the evasion is determined. The movable body is oriented in a reference direction at an end point of the evasion route.

The problem of not being able to display visual information that may be intuitively used by a vessel navigating personnel to navigate a ship safely on the planned route is solved by using a navigation planning system that determines the evasive route ahead of a current position of the movable body when the obstacle is determined in the planned route. Accordingly, the navigation planning system of the present disclosure allows the vessel navigating personnel, i.e., a user who operates the ship to safely navigate the movable body on the evasive route displayed on a screen of a display module by avoiding collisions with surrounding obstacles such as, but not limited to, target ships, terrains.

BRIEF DESCRIPTION OF DRAWINGS

The illustrated embodiments of the subject matter will be best understood by reference to the drawings, wherein like parts are designated by like numerals throughout. The following description is intended only by way of example, and simply illustrates certain selected embodiments of devices, systems, and processes that are consistent with the subject matter as claimed herein.

FIG. 10 illustrates a table that represents multiple potential evasive routes and the corresponding collision risk values, the route lengths, and the traveling distances of the respective potential evasive routes, according to yet another embodiment of the present disclosure;

FIGS. 31A-31D, collectively, represent a flow chart illustrating a navigation planning method in accordance with another embodiment of the present disclosure.

DETAILED DESCRIPTION OF THE EMBODIMENTS

Figure 1:
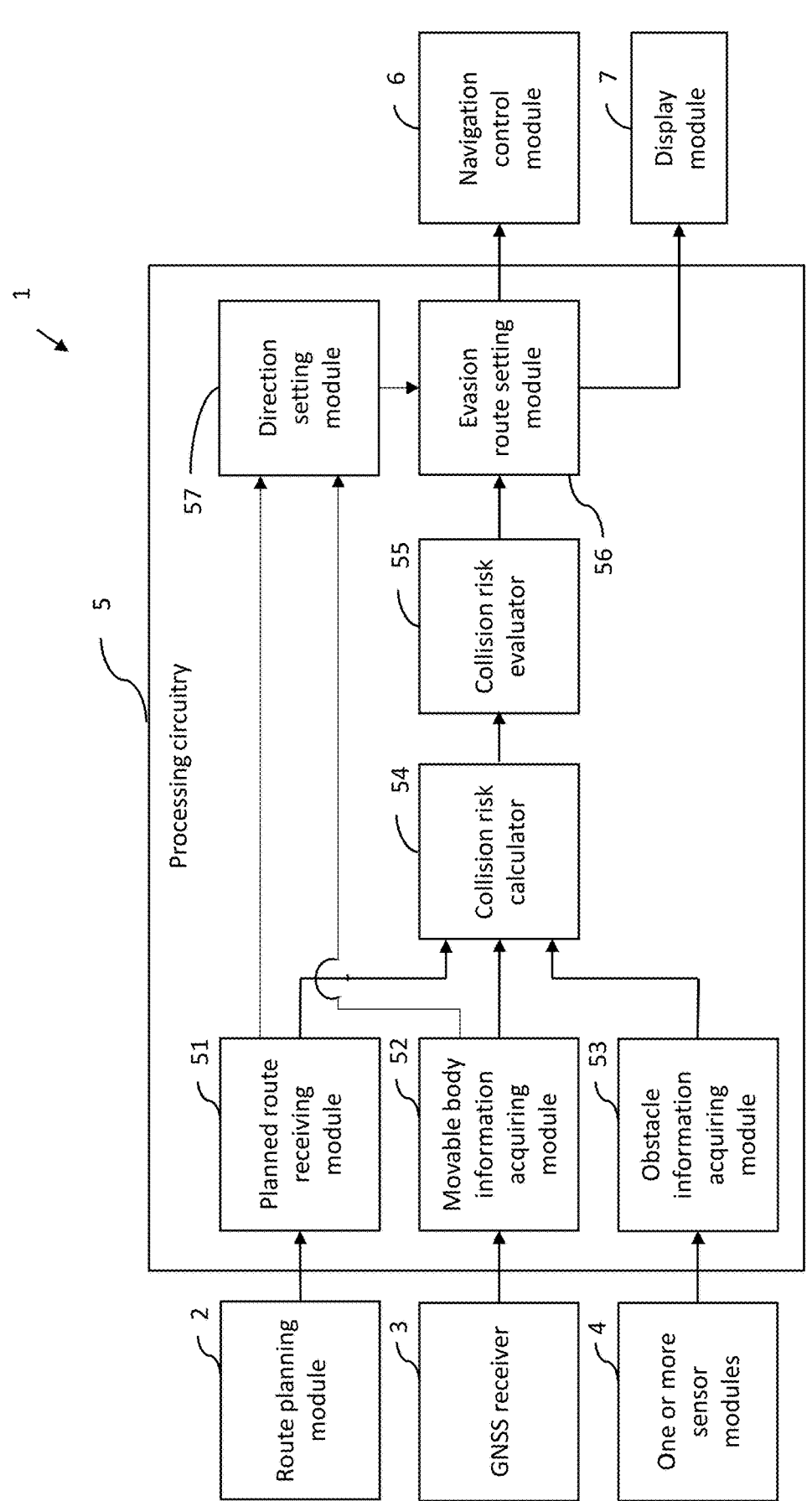
FIG. 1 is a block diagram illustrating a configuration of a navigation planning system for safely navigating a movable body (or own ship) according to one embodiment of the present disclosure.

Example apparatus or system are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

Figure 2A:
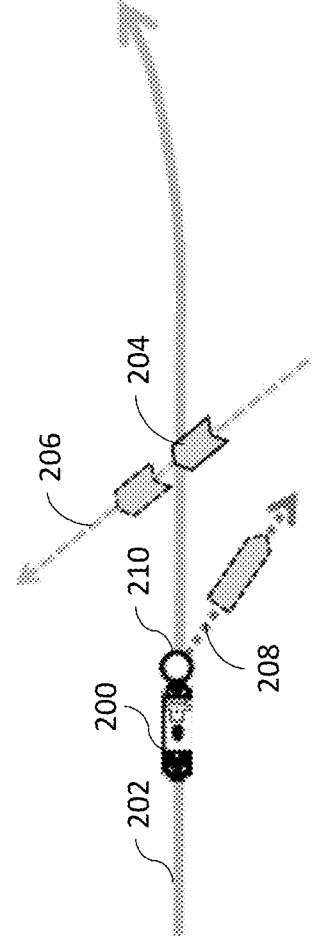
FIG. 2A and FIG. 2B, collectively, illustrates a region surrounding the movable body, according to one embodiment of the present disclosure.
Figure 2B:
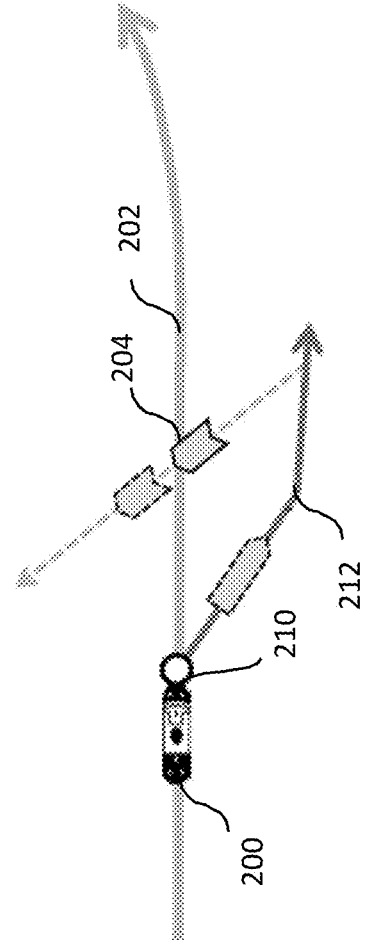

FIG. 1 is a block diagram illustrating a configuration of a navigation planning system 1 for safely navigating a movable body 200 (hereinafter also referred to as an "own ship 200"), according to one embodiment of the present disclosure. FIG. 2A and FIG. 2B illustrates a region surrounding the own ship 200, according to one embodiment of the present disclosure.

The navigation planning system 1 may be installed on the own ship 200 for navigation of the own ship 200 from a source location to a destination location. Once the voyage has begun, the navigation of the own ship 200 along a planned route 202 that is a path to be followed by the own ship 200 between the source location and the destination location must be monitored. The navigation planning system 1 is configured to be used for safely navigating the own ship 200 by avoiding collisions with surrounding obstacles such as, but not limited to, target ships, terrains, and other target objects. A ship operator, i.e., a user who operates the own ship 200, navigates the own ship 200 along the planned route 202 with an assistance of the navigation planning system 1. In one embodiment, as illustrated in FIG. 2A and FIG. 2B, the planned route 202 is a path to be followed by the own ship 200 to navigate and safely reach the destination location.

The navigation planning system 1 includes a route planning module 2, a global navigation satellite system (GNSS) 3, one or more sensor modules 4, a processing circuitry 5, a navigation control module 6, and a display module 7.

The route planning module 2 is configured to store a plurality of routes for navigation of the own ship 200. In one embodiment, the user may operate various peripheral devices operably coupled with the navigation planning system 1 for performing various functions pursuant to functionalities in the present disclosure. For example, the user may provide various kinds of instructions to the navigation planning system 1 about the source location and the destination location for navigation of the own ship 200 by operating the peripheral devices, such as a keyboard and/or the mouse. Based on the information obtained from the user, such as the source location and the destination location, the route planning module 2 may provide the plurality of routes for navigation of the own ship 200 from the source location to the destination location. In one embodiment, each route from the plurality of routes may be associated with route information that may include: date and time of travel, weather conditions, tidal conditions, or the like. The route planning module 2 receives a user input from the user regarding selection of a route as the planned route 202 from the plurality of routes for navigation of the own ship 200 from the source location to the destination location. It will be apparent to person skilled in the art that although in the present embodiment, the user selects the route for travelling, in an alternate embodiment, an optimal route may be selected by the route planning module 2 based on current weather conditions, time of travel, tidal conditions, and the like.

The navigation planning system 1 uses information associated with the movable body 200 and one or more obstacles in the region surrounding the own ship 200 for safely navigating the own ship 200 from the source location to the destination location along the planned route 202. The GNSS 3 acquires movable body information that includes a position, a travelling direction (i.e., a moving direction), and a speed of the own ship 200. The GNSS 3 accurately acquires the movable body information of the own ship 200 based on information from satellites. Further, the one or more sensor modules 4 acquire obstacle information that includes a position, a travelling direction (i.e., a moving direction), and a speed of an obstacle 204 that may interfere with the navigation of the own ship 200. The one or more sensor modules 4 may correspond to one or more conventional maritime electronics devices. The one or more sensor modules 4 include a radio detection and ranging (RADAR) device, a light detection and ranging (LIDAR) device, a sound navigation and ranging (SONAR) device, an automatic identification system (AIS) receiver, an image sensor installed on the own ship 200, or the like. In one embodiment, the obstacle information includes information detected by the RADAR, the LIDAR device, the SONAR device, or the image sensor, information acquired by the AIS receiver, information transmitted from another ship, or information acquired by detection of a radio communication at a place other than the own ship 200.

In one embodiment, the obstacle information further includes information relating to other movable bodies that include: other vessels, tidal currents, weather, reefs, or stranded ships. It will be apparent to a person skilled in the art that the information relating to the other movable bodies is acquired in a similar manner as the information for the obstacle 204 is acquired.

With continued reference to FIG. 1, the processing circuitry 5 includes a planned route receiving module 51, a movable body information acquiring module 52, an obstacle information acquiring module 53, a collision risk calculator 54, and a collision risk evaluator 55, an evasion route setting module 56 (also referred to as an evasion route generator), and a direction setting module 57.

Referring now to FIG. 1, and FIGS. 2A-2B, the planned route receiving module 51 may be operably coupled with, and hence in communication with, the route planning module 2 for receiving the route selected by the ship operator as the planned route 202. The planned route indicates a navigation planning route for the movable body 200 on the water. Further, the movable body information acquiring module 52 may be operably coupled with, and hence in communication with the GNSS 3 for receiving the movable body information associated with the own ship 200. The movable body information acquiring module 52 is further configured to store the acquired movable body information.

The obstacle information acquiring module 53 may be operably coupled with, and hence in communication with the one or more sensor modules 4 for receiving the obstacle information associated with the obstacle 204. The obstacle information acquiring module 53 is further configured to store the obstacle information. In one embodiment, the movable body information acquiring module 52 periodically acquires the movable body information of the own ship 200, and the obstacle information acquiring module 53 periodically acquires the obstacle information of the obstacle 204.

The collision risk calculator 54 may be operably coupled with, and hence in communication with the planned route receiving module 51, the movable body information acquiring module 52, and the obstacle information acquiring module 53. The collision risk calculator 54 receives the route selected by the user as the planned route 202, the movable body information of the own ship 200, and the obstacle information of the obstacle 204.

The collision risk calculator 54 is further configured to determine a collision risk value associated with the planned route 202 based on the movable body information and the obstacle information. The collision risk value is calculated based on the position, the travelling direction, and the speed of the own ship 200 and the obstacle 204. The collision risk value indicates a degree of the risk of collision between the own ship 200 and the obstacle 204. In one embodiment, the collision risk value indicates a risk level of collision between the movable body 200 and an obstacle from the plurality of obstacles. In one example, if the obstacle 204 is sailing along a predicted future path 206 and the own ship 200 continues to sail along the planned route 202 such that the predicted future path 206 and the planned route 202 interfere at a point as illustrated in the FIG. 2A and FIG. 2B, then the collision risk value is high and there will be a higher risk of collision between the own ship 200 and the obstacle 204.

Further, the collision risk evaluator 55 may be operably coupled with, and hence in communication with the collision risk calculator 54 and configured to receive the collision risk value. In one embodiment, the collision risk evaluator 55 may be configured to determine a necessity of evasion based on comparing the collision risk value with a threshold value. The collision risk evaluator 55 is configured to determine whether the own ship 200 requires to evade the planned route 202 and continue traversing on the planned route 202 based on the collision risk value associated with the planned route 202. Relevant potential risks of collision may be determined by evaluating the collision risk value. If the collision risk is high, then the own ship 200 is required to evade the planned route 202. In one example, if the collision risk evaluator 55 determines that the own ship 200 requires to evade the planned route 202 based on the collision risk value, then the navigation planning system 1 facilitates the ship operator to sail the own ship 200 through a different course 208 i.e., an evasive route from a current position of the own ship 200 as a reference point 210 as illustrated in the FIG. 2.

Further, the evasive route setting module 56 may be operably coupled with, and hence in communication with the collision risk evaluator 55. The evasive route setting module 56 is configured to set an evasive route 212 in place of the planned route 202 ahead of the current position 210 as the reference point of the own ship 200. In one embodiment, the evasion route setting module 56 determines the evasion route 212 different from the planned route when the collision risk evaluator 55 determines the necessity of the evasion. The movable body 200 is oriented in a reference direction at an end point of the evasion route. In one embodiment, the end point of the evasion route is not present on the planned route 202.

The evasive route setting module 56 sets the evasive route 212 when the obstacle 204 is determined on the planned path 202 of the own ship 200 as illustrated in the FIG. 2A and FIG. 2B such that the collision risk value associated with the evasive route 212 is less than or equal to the threshold value (i.e., a predetermined threshold value). The evasive route setting module 56 sets the evasive route 212 based on the estimated collision risk value associated with the planned route 202. If the estimated collision risk value is high then the evasive route setting module 56 generates and sets the evasive route 212 for the own ship 200 for avoiding collisions with the obstacle 204.

The generated evasive route 212 starts from an evasive starting point 210. The evasive starting point 210 is the current position of the own ship 200 from where the own ship 200 begins to evade. The ship operator i.e., the user who operates the own ship 200 may navigate the own ship 200 along the generated evasive route 212 for avoiding the collision with the obstacle 204. When the own ship 200 is navigating on the evasive route 212, the collision risk calculator 54 may regenerate the evasive route 212 even if the collision risk value is less than the predetermined threshold value. In one scenario, the surrounding situation changes due to movement of the obstacle 204 resulting into change in the collision risk value, and thus the already set evasive route 212 may become a long route. Further, in one embodiment, the set evasive route 212 is fed back to the collision risk calculator 54, and the collision risk calculator 54 determines the collision risk value associated with the evasive route 212. In addition, the collision risk evaluator 55 determines whether the collision risk value for the evasive route 212 is less than the predetermined threshold value to determine whether the own ship 200 may continue to navigate on the evasive route 212.

The evasion route setting module 56 may acquire evasion route information generated outside the movable body 200 via wireless communication such as satellite communication or may acquire the evasion route information about the evasion route set in the evasion route setting module 56. The evasion route setting module 56 is configured to generate a plurality of potential evasion route patterns different from the planned route between the evasion starting point and the end point, in the reference direction, away from the planned route. In one embodiment, the movable body 200 is oriented in the reference direction at the end point of the evasion route.

In one embodiment, the direction setting module 57 is coupled with the evasion route setting module 56. The direction setting module 57 receives the planned route 202 from the planned route receiving module 51 and the movable body information from the movable body information module 52. The direction setting module 57 is further configured to determine a direction of the end point of each potential evasion route pattern from the plurality of potential evasion route patterns based on the planned route and the movable body information. In one embodiment, the direction setting module 57 determines a position of the movable body 200 at the beginning of the evasion based on the planned route 202. Further, the direction setting module 57 acquires a direction of the movable body 200 based on the movable body information. Furthermore, the direction setting module 57 determines the direction of the end point of each potential evasion route patterns from the plurality of potential evasion route patterns based on the position of the movable body 200 and the direction of the movable body 200.

The direction of the end point of each potential evasion route pattern from the plurality of potential evasion route patterns is one of: parallel to the direction of the movable body 200 at a position (i.e., the evasion starting point) where the movable body 200 begins to deviate from the planned route, parallel to a direction at a selected point on a unnavigated planned route, toward a destination from the position where the movable body begins to evade, and toward the selected point on the unnavigated planned route from the position where the movable body begins to evade.

The evasion route setting module 56 is configured to acquire the direction of the end point associated with each potential evasion route pattern from the direction setting module 57. The evasion setting module 56 is further configured to select the evasion route (i.e., a potential evasion route pattern) from the plurality of potential evasion route patterns based on the direction of the end point of each potential evasion route pattern.

Referring now to FIG. 1, and FIGS. 2A-2B, the navigation control module 6 may be operably coupled with, and hence in communication with the evasion route generator 56. The navigation control module 6 is configured to monitor and control the navigation of the own ship 200, based on the determination whether the own ship 200 requires to evade the planned route 202 and continue traversing on the planned route 202. To control the navigation of the own ship 200, the navigation control module 6 may control the position, the travel direction, and the speed of the own ship 200. Based on the determination that the own ship 200 is required to evade the planned route 202, the navigation control module 6 navigates the own ship 200 along a route, such as the evasive route 208, different than the current planned route 202.

The display module 7 may be located on-board the own ship 200 and provided with, or in electrical connection to, the collision risk evaluator 55 on the own ship 200, as the ship instrument for purposes as will be explained in detail later herein. The display module 7 displays the planned route 202 along which the own ship 200 is traversing. In addition, when the own ship 200 is required to evade the planned route 202, the display module 7 displays the evasive route 208 along which the own ship 200 navigates to avoid the collision with the obstacle 204. Thus, the ship operator may safely navigate the own ship 200 by avoiding the collision with the obstacle 204.

The display module 7 may be configured as, for example, a display screen that forms part of a navigation assisting device to which a ship operator, i.e., a user, who operates the own ship 200 refers. However, the display module 7 is not limited to the above configuration, and, for example, it may be a display screen for a portable computer which is carried by a ship operator's assistant who monitors the surrounding situation from the own ship 200, a display screen for a passenger to watch in the cabin of the own ship 200, or a display part for a head mounted display, such as a wearable glass, worn by a passenger.

In one embodiment, the movable body information acquiring module 52 is configured to periodically acquire the movable body information. The obstacle information acquiring module 53 is configured to periodically acquire the obstacle information. Further, the collision risk calculator 54 is configured to periodically calculate the collision risk value. The collision risk evaluator 55 is configured to periodically determine the necessity of the evasion. The evasion route setting module is further configured to periodically set the evasion route when the collision risk evaluator determines the necessity of the evasion.

Figure 3:
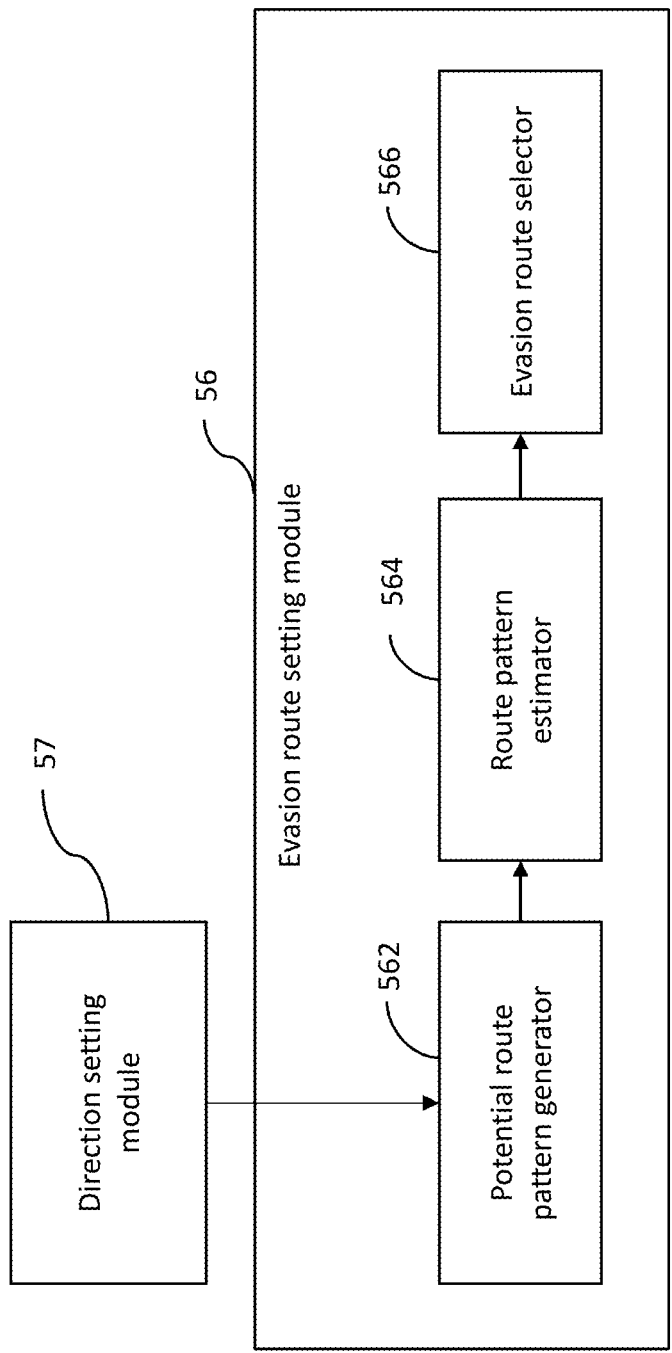
FIG. 3 block diagram illustrating an evasive route setting module, according to one embodiment of the present disclosure.
Figure 4:
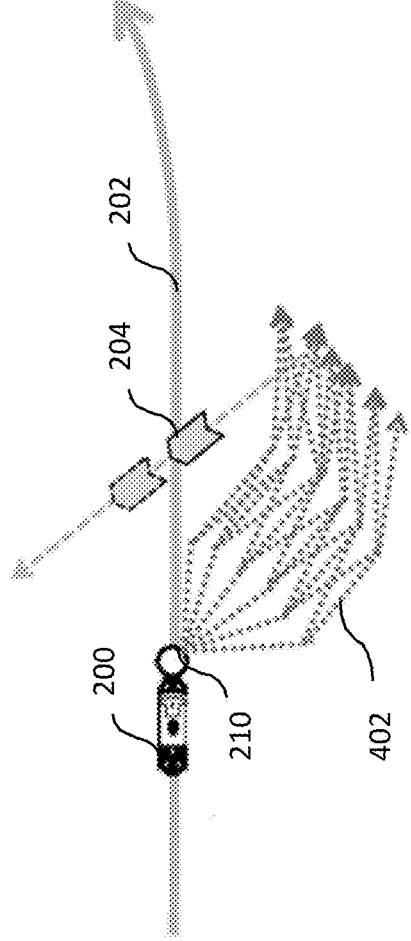
FIG. 4 illustrates a plurality of potential evasive route patterns generated for the own ship, according to one embodiment of the present disclosure.

FIG. 3 is a block diagram illustrating the evasive route generator, according to one embodiment of the present disclosure. FIG. 4 illustrates a plurality of potential evasive route patterns generated for the own ship, according to one embodiment of the present disclosure. In one embodiment, the evasive route setting module 56 includes a potential evasive route pattern generator 562, a route pattern estimator 564, and an evasive route selector 566. The potential evasive route pattern generator 562 may be operably coupled with, and hence in communication with the direction setting module 57. The potential evasive route pattern generator 562 generates the plurality of potential evasive route patterns 402 in which the position of the own ship 200 is the evasive starting point 210. As shown in FIG. 4. the plurality of evasive route patterns 402 are candidates of the evasive route 212 from the evasive starting point 210 to a traveling destination of the own ship 200. The potential evasive route pattern generator 562 generates the plurality of potential evasive route patterns 402 when a risk of collision between the own ship 200 and the obstacle 204 is high. In one example, a first plurality of points are generated in a fan-like shape around the evasive starting point 210, and a second plurality of points is generated in a fan-like shape from each point of the first plurality of points. The plurality of potential evasive route patterns 402 may be generated by sequentially connecting the first plurality of points and the second plurality of points. In one embodiment, the potential evasion route pattern generator 562 is configured to generate the plurality of potential evasion route patterns different from the planned route 202 between the evasion starting point 210 on the unnavigated planned route and the end point away from the planned route 202.

The route pattern estimator 564 may be operably coupled with, and hence in communication with the potential evasive route pattern generator 562. The route pattern estimator 564 determines the collision risk value for each potential evasive route pattern of the plurality of potential evasive route patterns 402.

The evasive route selector 566 may be operably coupled with, and hence in communication with the route pattern estimator 564. The evasion route selector 566 is configured to select the potential evasive route pattern from the plurality of potential evasive route patterns 402 to be set as the evasive route 212 based on the determined collision risk value for each potential evasive route pattern of the plurality of potential evasive route patterns. The potential evasion route pattern is the evasion route 212 for the navigation of the movable body 200. In one embodiment, the evasion route 212 is an optimal route for the movable body 200.

In one embodiment, the route pattern estimator 564 is further configured to determine a route length of each potential evasive route pattern from the plurality of potential evasion route patterns 402. The route pattern estimator 564 determines the route length of each potential evasive route pattern based on the determined collision risk value for each potential evasive route pattern. The evasive route selector 566 is further configured to select the potential evasive route pattern from the plurality of potential evasive route patterns 402 based on the determined collision risk value and the route length of each potential evasive route pattern of the plurality of potential evasive route patterns 402. If the collision risk value is less, then the evasive route selector 566 selects an optimum potential evasive route pattern for the own ship 200. The lower the collision risk value, the longer the detour. Thus, the evasive route selector 566 selects the most appropriate potential evasive route pattern as the evasion route 212 based on the collision risk value and the route length of each potential evasive route pattern.

The evasion route selector 566 may be configured to select the evasion route that is the appropriate route when the determination is made to switch from the planned route 202 to the evasion route 212.

In one embodiment, the evasion route setting module 56 is configured to release a restriction on the direction of the end point of the evasion route and set a new evasion route having the collision risk value and a congestion risk value below the threshold value, when there is no evasion route having the collision risk value and the congestion risk value below the threshold value. In one embodiment, assume that there is no evasion route in the plurality of evasion route patterns having the collision risk value and the congestion risk value below the respective threshold values. In the embodiment, the evasion route setting module 56 is configured to set the new evasion route having the collision risk value and the congestion risk value below the threshold value.

In one embodiment, the evasion route setting module 56 is configured to select the evasion route from the plurality of potential evasion rote patterns 402 in which a distance traveled by the movable body 200 is minimum among the plurality of potential evasion route patterns, and a maximum collision risk value and a congestion risk value are equal to or less than the threshold value.

Figure 5:
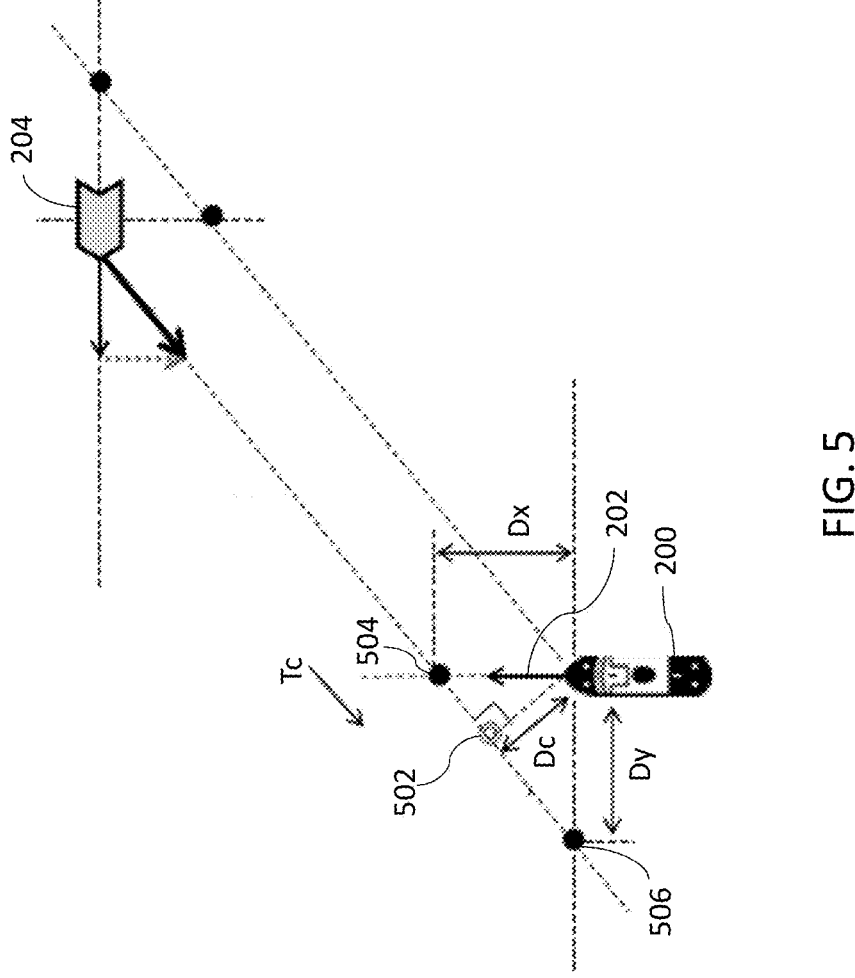
FIG. 5 illustrates determination of a collision risk value associated with a planned route, according to one embodiment of the present disclosure.

FIG. 5 illustrates determination of the collision risk value associated with the planned route 202, according to one embodiment of the present disclosure. The collision risk calculator 54 determines the collision risk value associated with the planned route 202 based on the movable body information and the obstacle information. The collision risk value associated with the planned route 202 may be determined based on the position, the travelling direction, and the speed of the own ship 200 and the obstacle 204.

The collision risk calculator 54 is further configured to determine one of: a closest distance Dc and a closest distance in a particular direction Dx or Dy between the own ship 200 and the obstacle 204 based on the movable body information and the obstacle information. In one embodiment, the closest distance Dc is a distance between a current location of the own ship 200 and a closest point of approach 502. The closest distance in a vertical direction Dx is a distance between the current location of the own ship 200 and the closest point of approach in the vertical direction 504. The closest distance in a lateral direction Dy is a distance between the current location of the own ship 200 and the closest point of approach in the lateral direction 506. The collision risk calculator 54 calculates the closest distances Dc, Dx, and Dy when the own ship 200 and the obstacle 204 approach each other, based on a positional relation between the own ship 200 and the obstacle 204, a relative velocity of the own ship 200 and the obstacle 204, a travelling direction and a speed of the own ship 200 and the obstacle 204.

The collision risk calculator 54 determines the collision risk value associated with the planned route 202 based on the closest distance Dc or the closest distance in a particular direction Dx or Dy between the own ship 200 and the obstacle 204.

In one embodiment, when the closest distance Dc is less than or equal to a predetermined distance, the collision risk evaluator 55 determines that the collision risk is high and the own ship 200 is required avoid the obstacle 204 by travelling on the evasive route 212. On the other hand, when the closest distance Dc is greater than the predetermined distance, the collision risk evaluator 55 determines that the collision risk is low and the own ship 200 may continue on the planned route 202. In another embodiment, when the closest distance in a particular direction Dx or Dy is less than or equal to a predetermined distance, the collision risk evaluator 55 determines that the collision risk is high and the own ship 200 is required avoid the obstacle 204 by travelling on the evasive route 212. On the other hand, when the closest distance in a particular direction Dx or Dy is greater than the predetermined distance, the collision risk evaluator 55 determines that the collision risk is low and the own ship 200 may continue on the planned route 202. In this embodiment, the collision risk value may be calculated by identifying the positional relationship between the own ship 200 and the obstacle 204 based on any of: the closest distance in the vertical direction Dx or the closest distance in the horizontal direction Dy. The risk of collision between the own ship 200 and the obstacle 204 increases when the obstacle 204 crosses ahead of the own ship 200.

In one embodiment, the collision risk calculator 54 is further configured to determine a time Tc required by the own ship 200 to traverse the closest distance Dc, and determine the collision risk value associated with the planned route 202 based on the closest distance De and the time Tc required by the own ship 200 to traverse the closest distance Dc. The time Tc required by the own ship 200 to traverse the closest distance De is calculated based on the movable body information and the obstacle information.

When the collision risk value is calculated on the basis of the closest distance De between the own ship 200 and the obstacle 204, the collision risk value increases even when the time until the own ship 200 approaches the obstacle 204 is very long. As a result, the own ship 200 may have to evade the planned route 202 to avoid collision with the obstacle 204 in after some time. Therefore, in one embodiment, the collision risk value associated with the planned route 202 is determined by taking into consideration the closest distance De between the own ship 200 and the obstacle 204, and the time Tc required by the own ship 200 to reach the closest point of approach 302.

In one example, the collision risk value associated with the planned route 202 is determined based on an equation (1) given below:

$$\text{Collision risk value} = \max(Dx, Dy) * Tc \tag{1}$$

Figure 6:
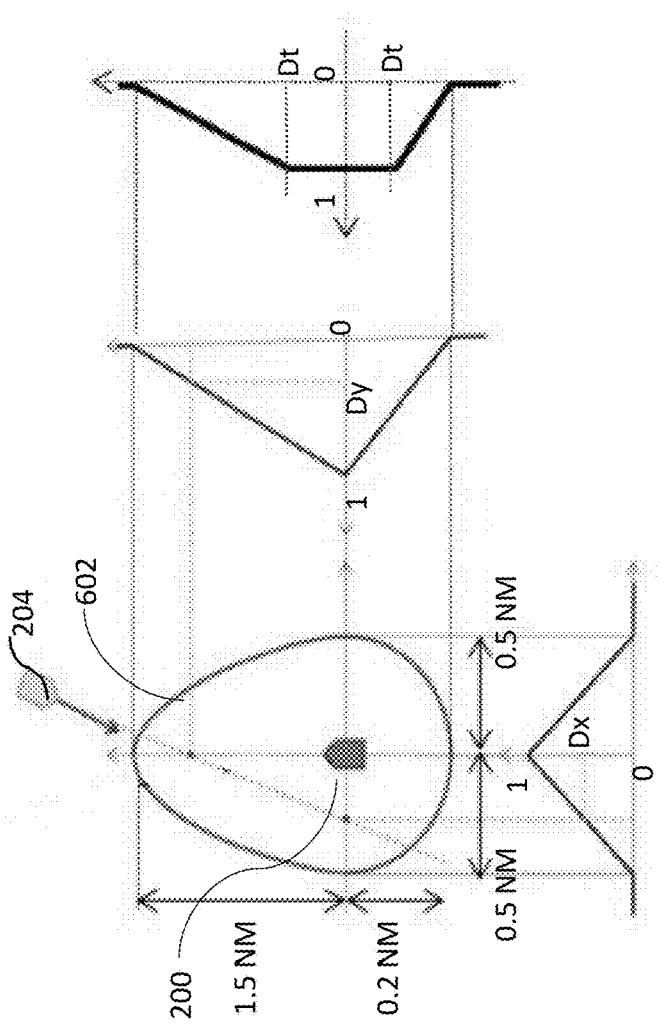
FIG. 6 illustrates determination of the collision risk value when the own ship approaches an obstacle, according to one embodiment of the present disclosure.

FIG. 6 illustrates determination of the collision risk value when the own ship 200 approaches the obstacle 204, according to one embodiment of the present disclosure. The collision risk value increases when the obstacle 204 enters an oval shaped area 602 around the own ship 200. In one example the oval shaped area 602 is determined based on a region within 1.5 nautical miles (NM) ahead, 0.2 NM miles behind, and 0.5 NM on sides of the own ship 200. The collision risk value increases if the distance between the own ship 200 and the obstacle 204 decreases. Thus, the collision risk value is inversely proportional to the distance between the own ship 200 and the obstacle 204. FIG. 6 further illustrates a relation between the collision risk value and a distance between the own ship 200 and the obstacle 204 in the vertical direction and a relation between the collision risk value and a distance the own ship 200 and the obstacle 204 in the lateral direction. In one example, the collision risk value for the closest distance in the vertical and lateral directions Dx and Dy are shown in FIG. 6. Based on the closest distance De between the own ship 200 and the obstacle 204, the threshold distance Dt is determined such that the collision risk value is high when the closest distance De between the own ship 200 and the obstacle 204 is less than or equal to the threshold distance Dt.

Figure 7:
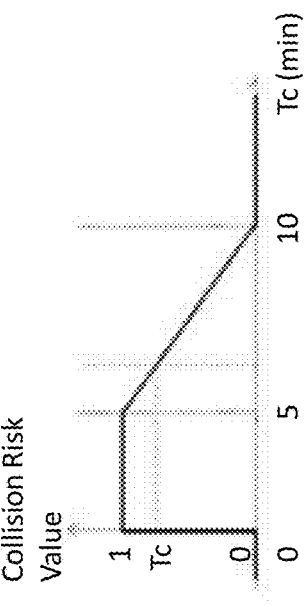
FIG. 7 illustrates a relationship between a time to a closest distance position and the collision risk value.

FIG. 7 illustrates a relationship between the time Tc required by the own ship 200 to traverse the closest distance Dc and the collision risk value. The collision risk value is high if the time Tc is less. In one example, the collision risk value is determined as high, i.e., maximum value of 1, when the time Tc is less than or equal to a predetermined time.

Figure 8A:
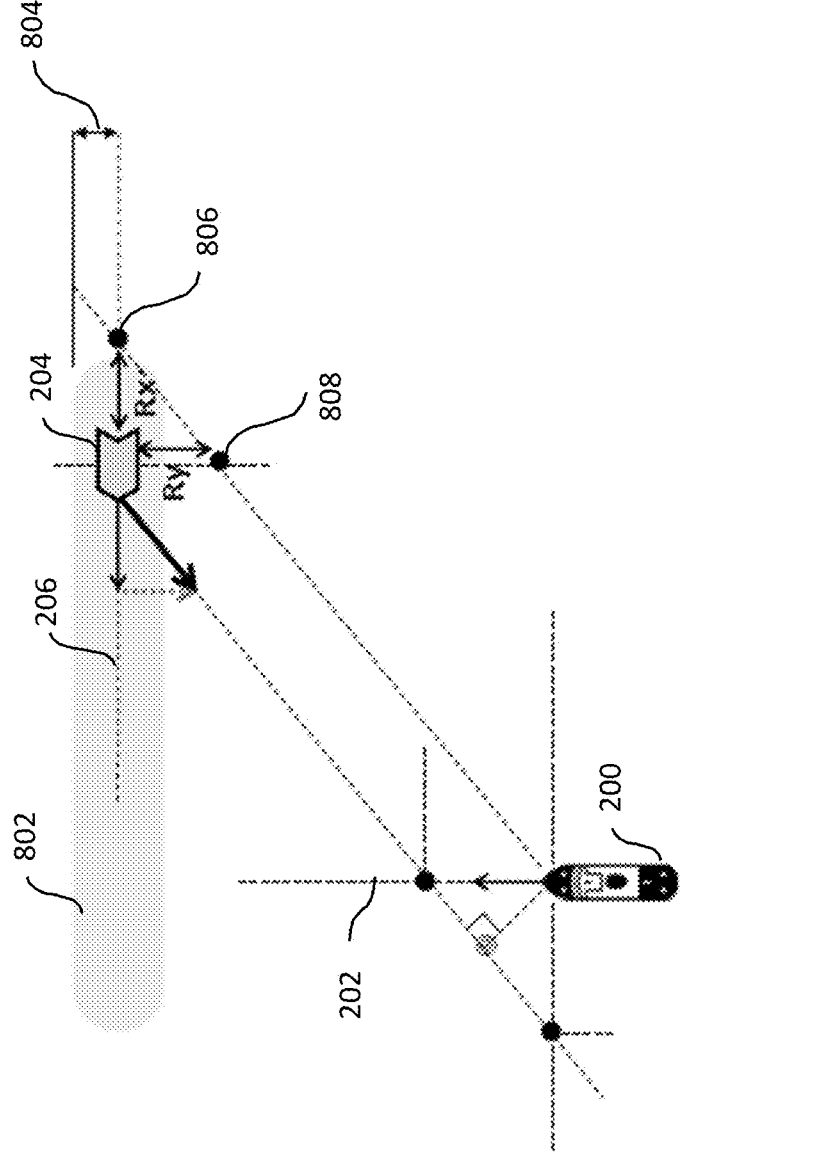
FIG. 8A illustrates determination of the collision risk value when the own ship approaches the obstacle, according to another embodiment of the present disclosure.

FIG. 8A illustrates determination of the collision risk value when the own ship 200 approaches the obstacle 204, according to another embodiment of the present disclosure. An obstacle bumper area 802 of the obstacle 204 is determined based on the position, the traveling direction, and the speed of the obstacle 204 i.e., a vessel. The obstacle bumper area 802 of the obstacle 204 is located on the predicted future path 206 of the obstacle 204 based on the travelling direction of the obstacle 204. The obstacle bumper area 802 of the obstacle 204 includes the obstacle 204 and a surrounding area of the obstacle 204. The obstacle bumper area 802 of the obstacle 204 may be determined based on a safe passing distance 804 which is an allowable closest distance to prevent collision. Further, the obstacle bumper area 802 corresponds to an access prohibition area or a collision risk area, and allows simultaneous recognition of an impact orientation and the distance between the own ship 200 and the obstacle 204. A closest point (with respect to the obstacle 204) in the vertical or lateral direction 806 or 808 between the own ship 200 and the obstacle 204 is determined based on the movable body information and the obstacle information. When the closest point in the vertical or lateral direction 806 or 808 between the own ship 200 and the obstacle 204 is outside the obstacle bumper area 802 there is no risk of collision. As illustrated in the FIG. 8A, in this embodiment, there is no risk of collision because neither the closest point in the vertical direction 806 at a distance of Rx nor the closest point in the lateral direction 808 at a distance Ry from the obstacle 204 is in the obstacle bumper area 802.

In one embodiment, the collision risk calculator 54 determines a time required for the own ship 200 to intrude into the obstacle bumper area 802 based on the relative speed between the own ship 200 and the obstacle 204. The collision risk calculator 54 further determines the collision risk value associated with the planned route 202 based on the time required for the own ship 200 to intrude into the obstacle bumper area 802.

Figure 8B:
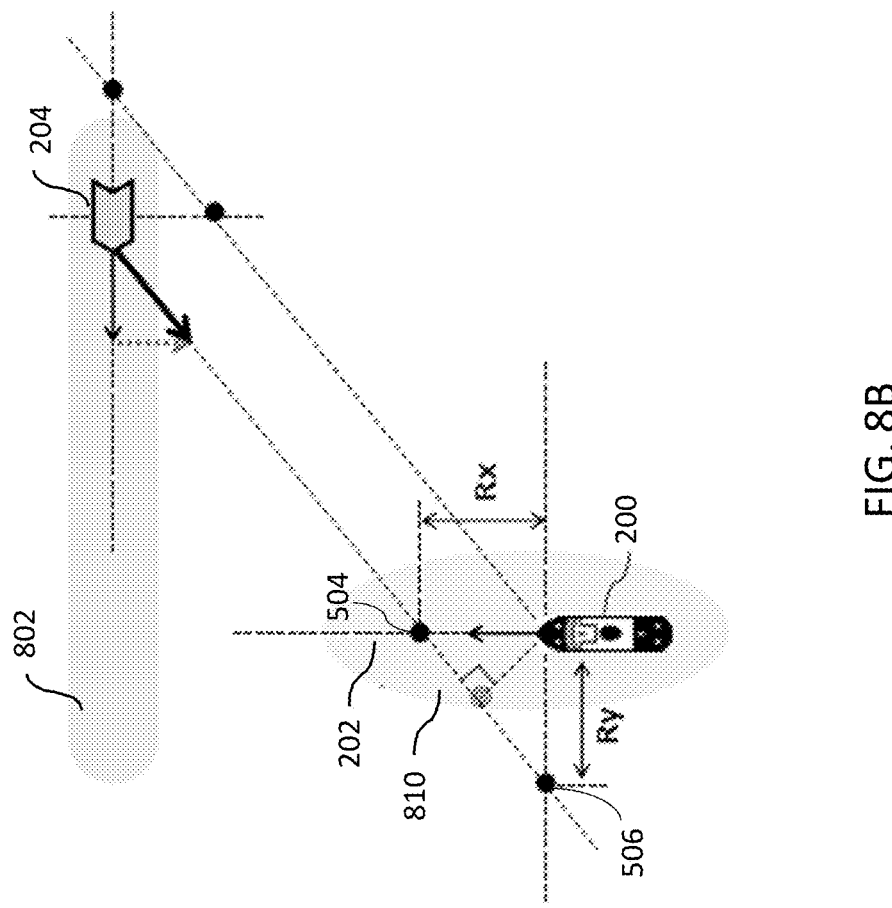
FIG. 8B illustrates determination of the collision risk value when the own ship approaches the obstacle, according to yet another embodiment of the present disclosure.

FIG. 8B illustrates determination of the collision risk value when the own ship 200 approaches the obstacle 204, according to yet another embodiment of the present disclosure. A movable body bumper area 810 of the own ship 200 is determined based on the position, the traveling direction, and the speed of the own ship 200. The movable body bumper area 810 of the own ship 200 is located on the planned route 202 of the own ship 200 based on the travelling direction of the own ship 200, and includes the own ship 200 and a surrounding area of the own ship 200. The closest point (with respect to the own ship 200) in the vertical or lateral direction 504 or 506 between the own ship 200 and the obstacle 204 is calculated based on the movable body information and the obstacle information. When the closest point in the vertical or lateral direction 504 or 506 between the own ship 200 and the obstacle 204 is outside the movable body bumper area 810 there is no risk of collision. As illustrated in the FIG. 8B, in this embodiment, there is a risk of collision because the closest point in the vertical direction 504 at the distance Rx from the own ship 200 is in the movable body bumper area 810.

If the own ship 200 continues to sail in the current direction along the planned route 202 and intrudes into the obstacle bumper area 802 of the obstacle 204 then there may be a risk of collision. In one embodiment, the collision risk calculator 54 determines a time required for the movable body bumper area 810 to intrude into the obstacle bumper area 802 based on the relative speed between the own ship 200 and the obstacle 204. The collision risk calculator 54 further determines the collision risk value associated with the planned route 202 based on the time required for the movable body bumper area 810 to intrude into the obstacle bumper area 802.

Figure 9:
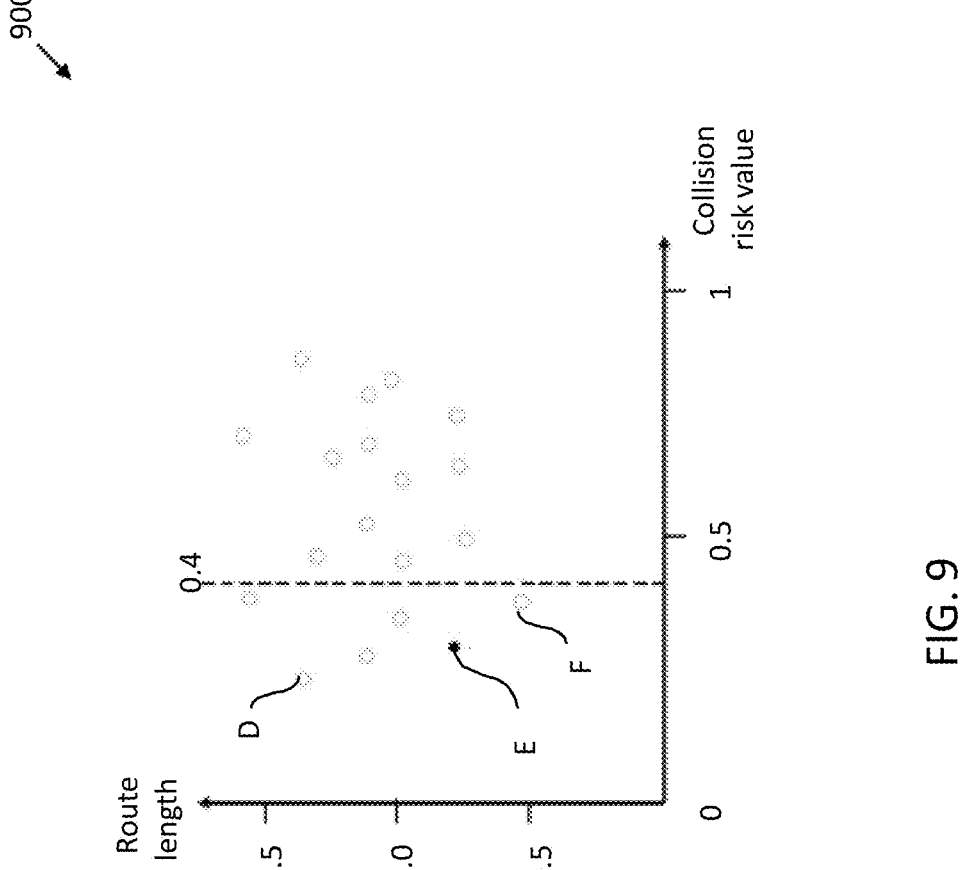
FIG. 9 illustrates a graph that represents a correlation between a collision risk value and a route length for each potential evasive route pattern, according to yet another embodiment of the present disclosure.

FIG. 9 illustrates a graph 900 that represents a correlation between the collision risk value and the route length for each potential evasive route pattern, according to yet another embodiment of the present disclosure. The collision risk values are represented on X-axis and the route lengths (in NM) are represented on Y-axis. Assuming that the collision risk value of less than 0.4 is required for safe navigation and avoiding collision, there are at least 6 potential evasive route patterns generated by the potential evasive route pattern generator 562. In one example, the potential evasive route pattern "D" has the smallest collision risk value, but the route length of the respective potential evasive route pattern "D" is long. Further, the potential evasive route pattern "F" has a short route length compared with the potential evasive route pattern "D," but the collision risk value is close to 0.4. In addition, the potential evasive route pattern "E" having the smallest collision risk value compared with the potential evasive route pattern "F" and the route length of the respective potential evasive route pattern "E" is small compared with the potential evasive route pattern "D". Therefore, in this example, the evasive route selector 566 may select the potential evasive route pattern "E" as an optimal potential evasive route pattern.

In one scenario, if there is no potential evasive route pattern whose collision risk value is less than or equal to the predetermined threshold value, then none of the plurality of potential evasive route patterns is selected. In this case, the navigation planning system 1 may provide any of: a signal that indicates no evasive route pattern is found or/and an error message may be displayed that indicates no evasive route pattern is found.

FIG. 10 illustrates a table 1000 that represents multiple potential evasive routes and the corresponding collision risk values, the route lengths, and the traveling distances of the respective potential evasive routes. The evasive route selector 566 selects the evasive route pattern from the plurality of potential evasive route patterns 402 based on the collision risk values, the route lengths, and the traveling distances of the respective potential evasive routes. In one example, the evasive route selector 566 may select the potential evasive route pattern "E" because the collision risk value, the pass length, and the traveling distance are optimal compared with the potential evasive route patterns A, B, D, and F as shown in the table 1000.

Figure 11:
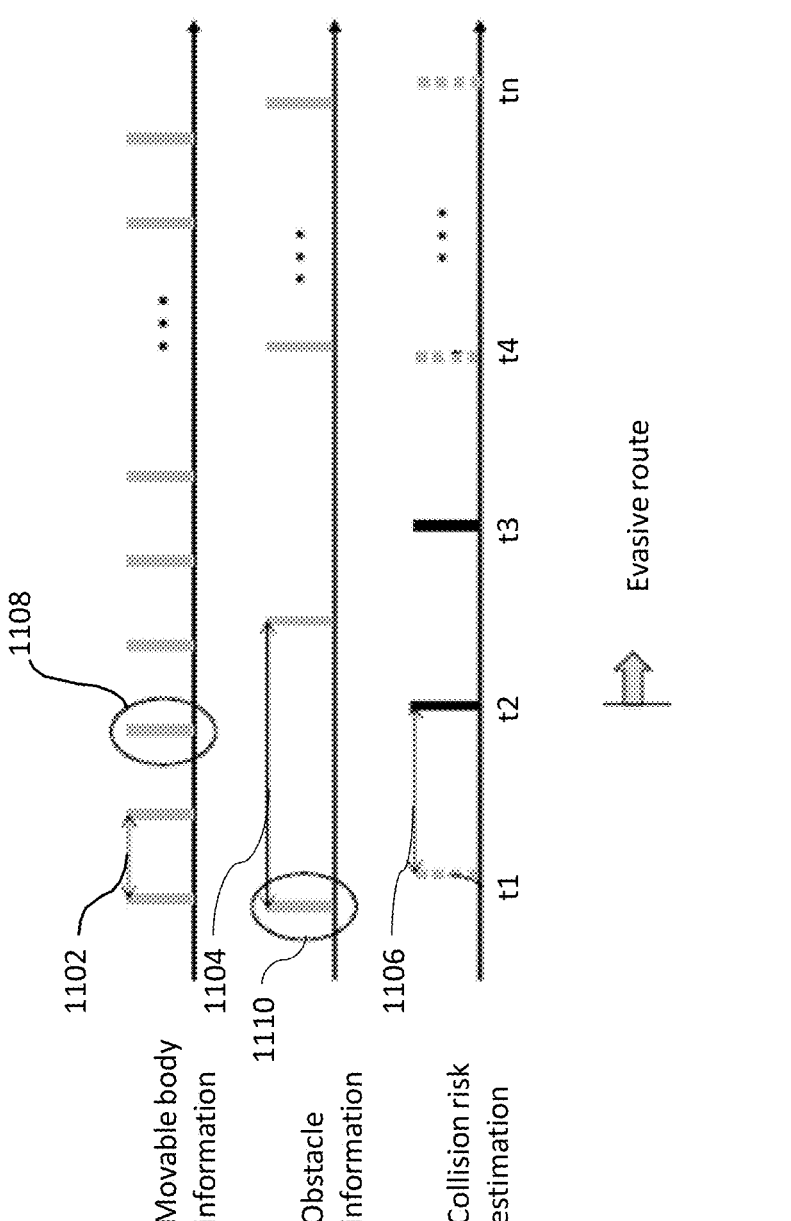
FIGS. 11-12 illustrate calculation of the collision risk value based on latest movable body information and latest obstacle information, according to yet another embodiment of the present disclosure.
Figure 12:
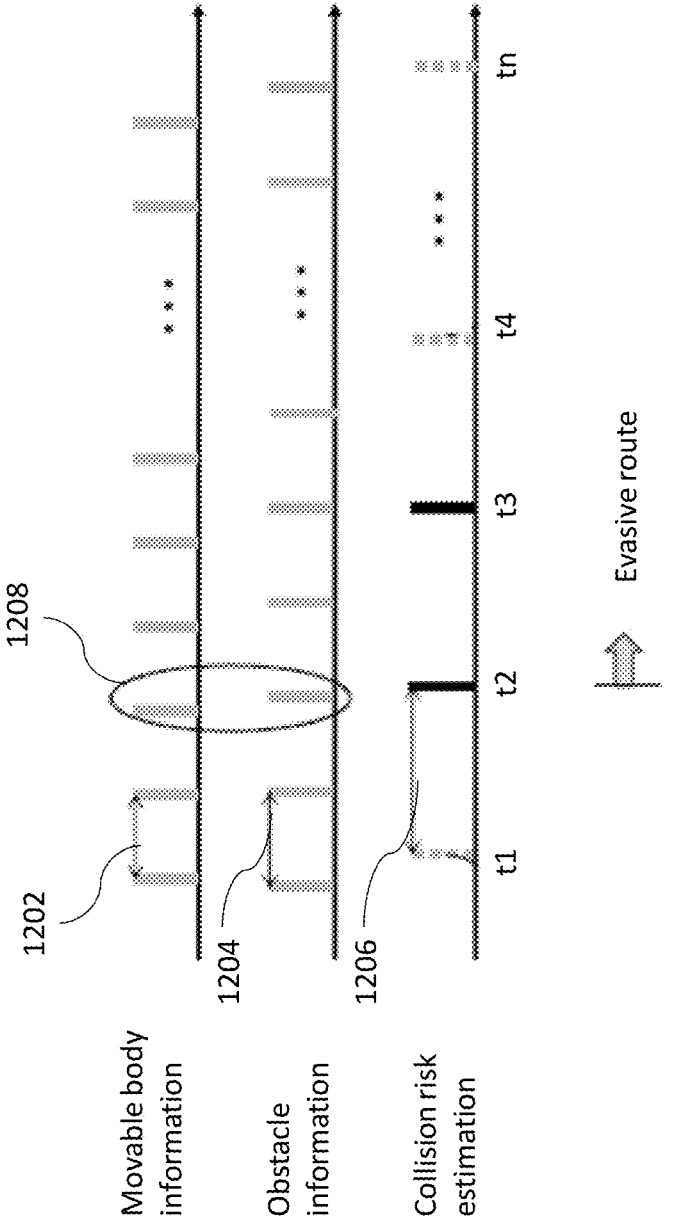

FIGS. 11-12 illustrate calculation of the collision risk value based on latest movable body information and latest obstacle information, according to one embodiment of the present disclosure. As the own ship 200 navigates, the surrounding area of the own ship 200 changes accordingly. Therefore, the movable body information acquiring module 52 is further configured to periodically receive the movable body information in a first time period 1102, i.e., at regular intervals of the first time period 1102. Similarly, the obstacle information acquiring module 53 is further configured to periodically acquire the obstacle information in a second time period 1104, i.e., at regular intervals of the second time period 1104. The evasive route generator 56 is further configured to periodically generate a latest evasive route based on a current position of the own ship 200. The current position of the own ship 200 is considered as a new evasive starting point of the latest evasive route.

In one embodiment, the evasive route generator 56 is further configured to periodically generate the latest evasive route in a third time period 1106, i.e., at regular intervals of the third time period 1106, which is shorter than the second time period 1104 and longer than the first time period 1102 as shown in FIG. 11, based on the updated acquired movable body information and the updated acquired obstacle information.

The movable body information acquiring terminal module 52 acquires the movable body information in the first time period 1102, which is shorter than the third time period 1106. The collision risk degree at the timing t2 is calculated based on the movable body information and the obstacle information acquired at the timing t1 and t2 that are indicated by circles 1108 and 1110, respectively.

The periodic acquisition of the movable body information and the obstacle information are preferable because higher is a frequency of acquisition, a greater number of times the collision risk value may be determined based on the latest movable body information and the latest obstacle information.

Referring now to FIG. 12, in yet another embodiment, the evasive route generator 56 periodically generates the latest evasive route pattern in a third time period 1206 which is longer than the first time period 1202 and the second time period 1204 based on the updated acquired movable body information and the updated acquired obstacle information. The collision risk degree at the timing t2 is calculated based on the movable body information and the obstacle information acquired at the timing t2 that are indicated by circles 1208. In FIG. 12, the obstacle information acquiring module 53 may acquire the obstacle information in the second time period 1204, which is shorter than the third time period 1206.

Ideally, it is preferable to acquire both the movable body information and the obstacle information at a high frequency and calculate the collision risk value based on the latest information. In one example, the collision risk value calculated at the timing t1 does not indicate a collision risk, but the value calculated at t2 indicates a high possibility of collision. Therefore, an evasive route is generated, and the own ship 200 is required to navigation along the evasive route. The calculated collision risk value at the timing t3 still indicates a collision risk with the obstacle, but the risk of collision decreases at t4 due to the evasive route.

Figure 13:
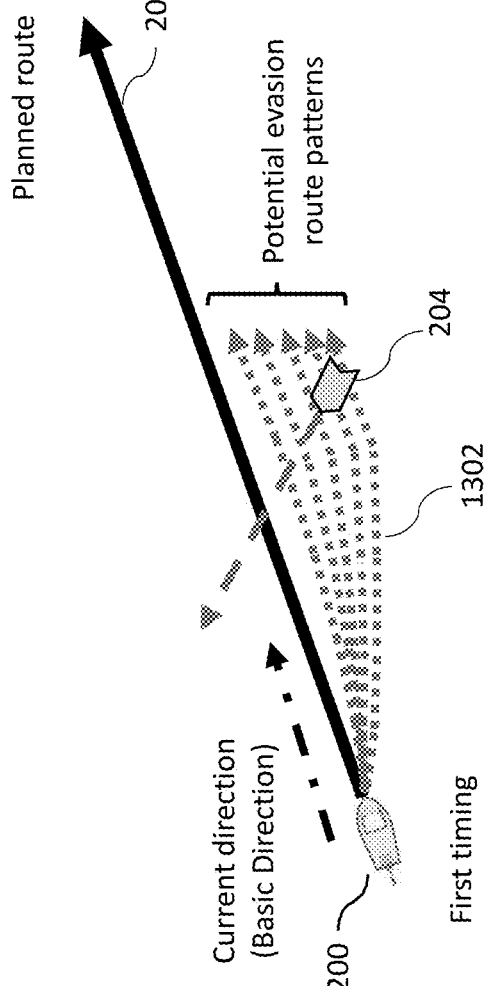
FIG. 13 illustrates determination of a direction of an end point of the plurality of potential evasion route patterns, according to an embodiment of the present disclosure.

FIG. 13 illustrates determination of a direction of an end point of the plurality of potential evasion route patterns, according to an embodiment of the present disclosure. In one embodiment, to avoid a collision of the moving body 200 with the obstacle 204 attempting to cross over the planned route 202, the direction at a time (i.e., first timing) when the moving body 200 is to be deviated is obtained (i.e., direction indicated by a dash-dot line). Further, the plurality of potential evasion route patterns 1302 is generated such that the direction at the end point of the evasion route coincides with the direction indicated by the dash-dot line. In one embodiment, the direction of the end point of each potential evasion route pattern from the plurality of potential evasion route patterns 1302 is determined based on the planned route 202 and the movable body information.

In one embodiment, the direction of the end point of each potential evasion route pattern from the plurality of potential evasion route patterns 1302 is parallel to the direction of the movable body 200 at a position where the movable body begins to deviate from the planned route 202, parallel to a direction at a selected point on the unnavigated planned route, toward a destination from the position where the movable body begins to evade, or toward the selected point on the unnavigated planned route from the position where the movable body 200 begins to evade.

Figure 14:
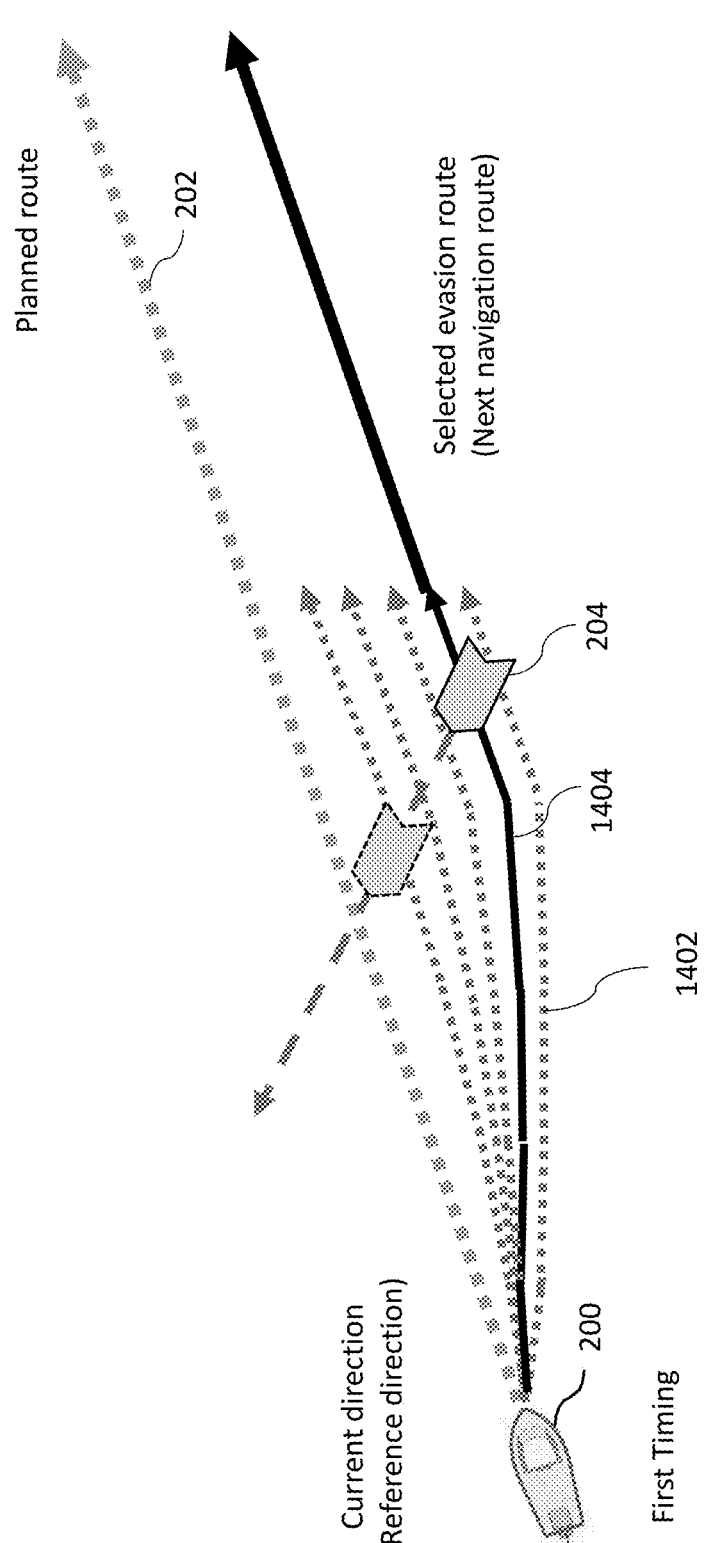
FIG. 14 illustrates determination of an evasion route for the own vessel, according to an embodiment of the present disclosure.

FIG. 14 illustrates determination of an evasion route for the own vessel, according to an embodiment of the present disclosure. In one embodiment, the potential evasion route pattern generator 562 generates the plurality of potential evasion route patterns 1402 different from the planned route 202 between an evasion starting point on the unnavigated planned route and the end point out of the planned route. Further, the route pattern estimator 564 evaluates the collision risk value of each potential evasion route pattern from the plurality of potential evasion route patterns 1402. Further, the evasion route selector 566 is configured to select a potential evasion route pattern, from the plurality of potential evasion route patterns, as the evasion route 1404 based on the collision risk value. In one embodiment, the potential evasion route pattern is selected as the evasion route 1404 for the movable body. As shown in FIG. 14, a route shown by a solid black line corresponds to the evasion route 1404. The selected evasion route 1404 is parallel to the planned route 202 (when it is a straight line). In one embodiment, although the selected evasion route 1404 is different from the location of the original planned route 202, the own vessel 200 may navigate on the evasion route 1404 as a new route.

Figure 15:
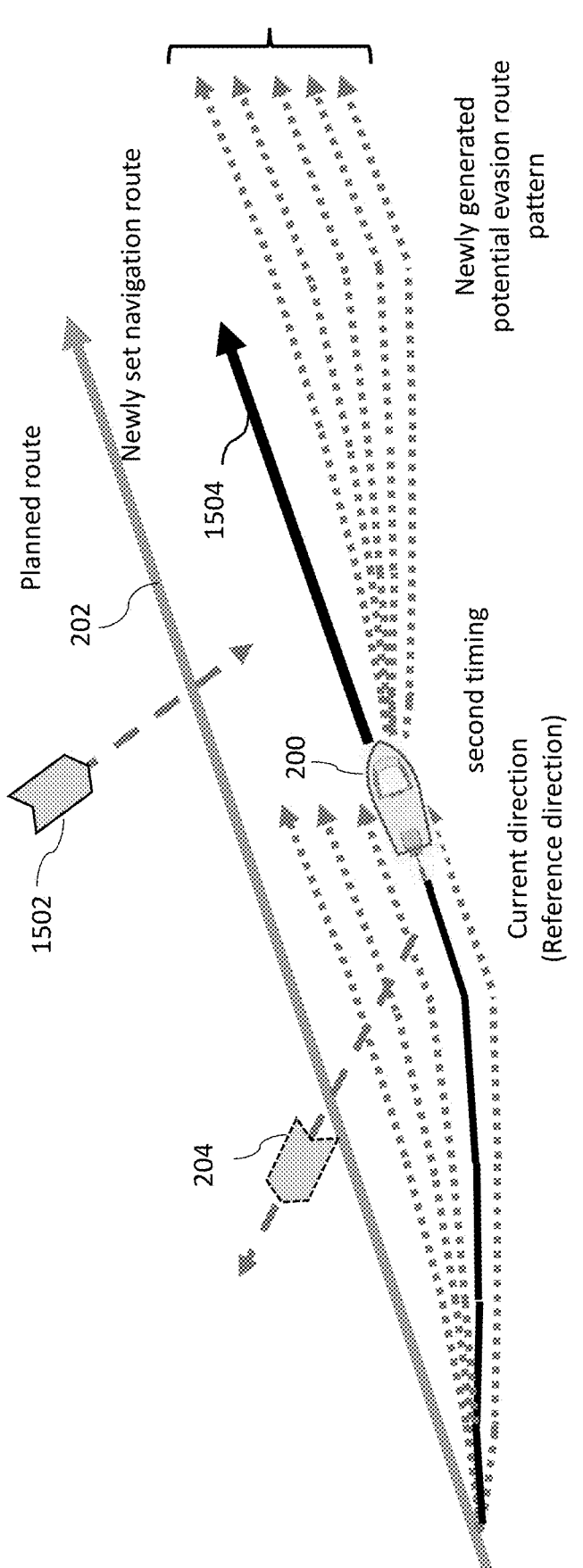
FIG. 15 illustrates determination of a new evasion route for the own vessel, according to an embodiment of the present disclosure.

FIG. 15 illustrates determination of a new evasion route for the own vessel, according to an embodiment of the present disclosure. In one embodiment, the navigation planning system 1 sets the evasion route different from the planned route 202 in order to avoid collision of the moving body 200 and the obstacle 204. In the embodiment, a second obstacle i.e., an obstacle 1502 is approaching the evasion route that is used by the moving body 200 for navigation. In order to avoid collision of the obstacle 1502 and the moving body 200, a plurality of new potential evasion route patterns is generated. Further, the collision risk calculator 55 determines the collision risk value for each new potential evasion route pattern. Based on the collision risk value, the evasion route setting module 56 selects a new potential evasion route pattern, from the plurality of new evasion route patterns, as a new evasion route 1504. The new evasion route 1504 is further used by the moving body 200 for navigation. In one embodiment, the new evasion route is generated in the same way as the generation of the evasion route as already described in above drawings.

Figure 16A:
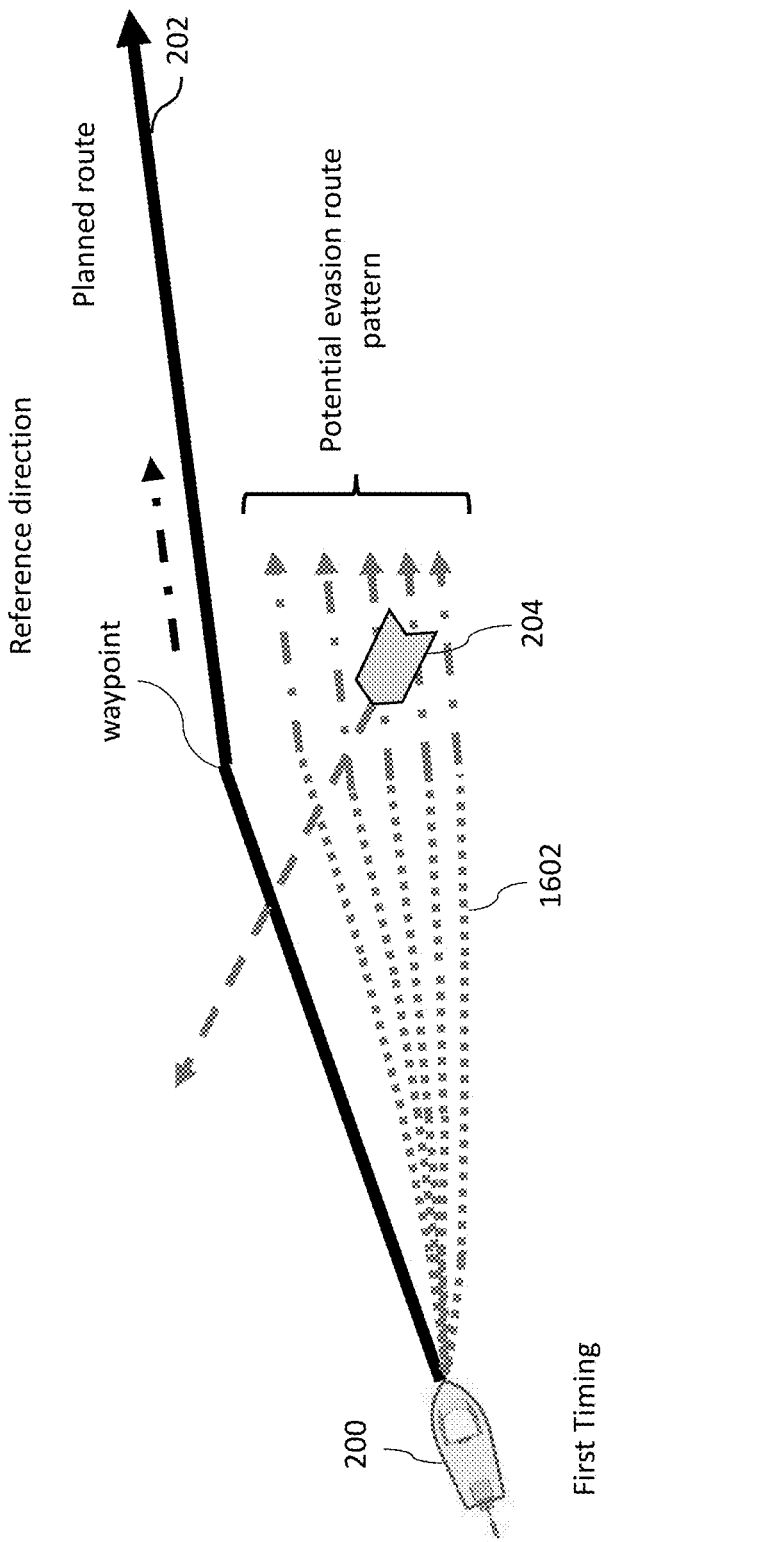
FIGS. 16A-16C, collectively, illustrates determination of the direction of the end point of the evasion route, according to yet another embodiment of the present disclosure.
Figure 16B:
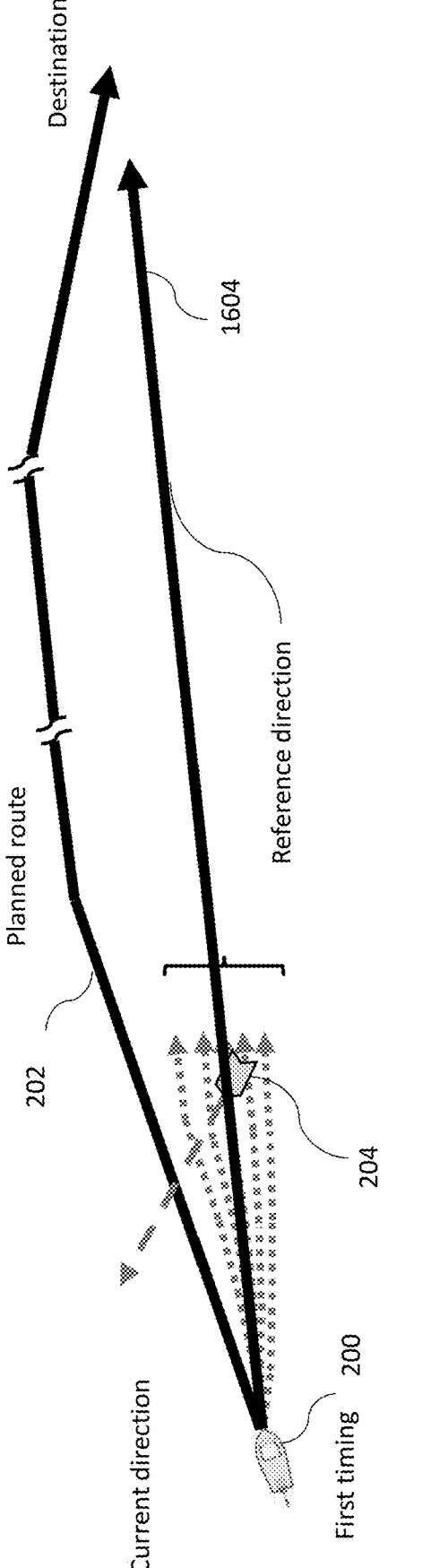
Figure 16C:
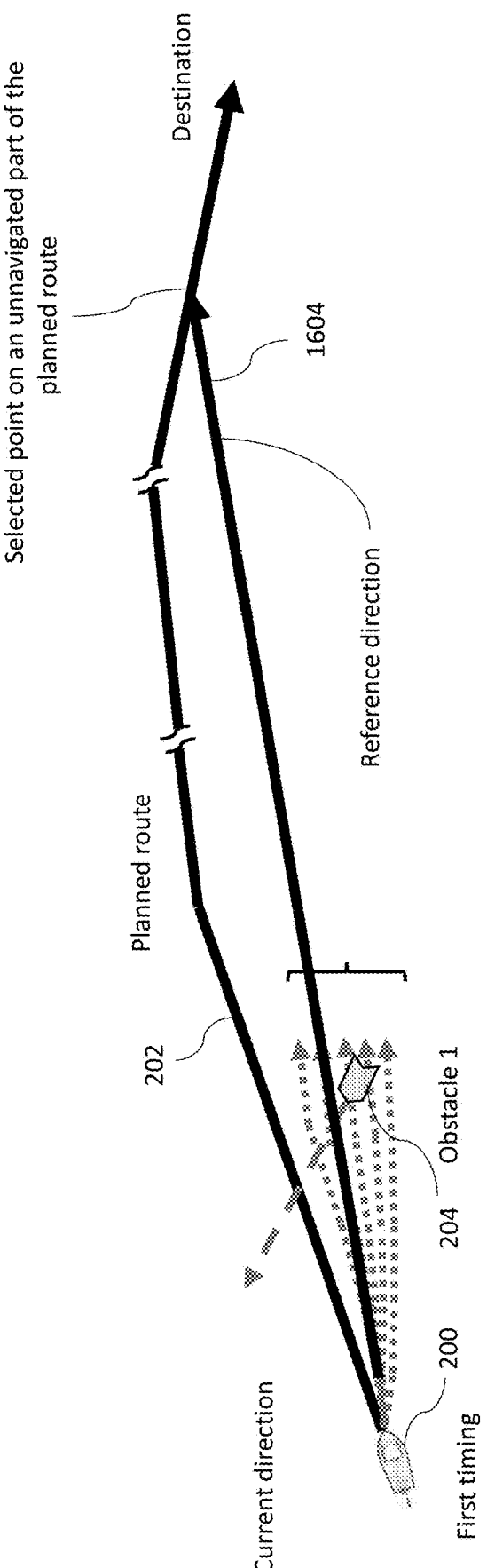

FIGS. 16A-16C, collectively, illustrates determination of the direction of the end point of the evasion route, according to yet another embodiment of the present disclosure. In one embodiment, the direction setting module 57 receives the direction of the planned route 202 and the direction of the moving body 200. In the embodiment, the direction setting module 57 determines the direction of the end point of each potential evasion route pattern from the plurality of potential evasion route patterns 1602 based on the direction of the planned route 202 at the time when the moving body 200 intends to start the evasion, but the setting of the direction is not limited. In the embodiment, the end point for the moving body 200 may be determined, and the direction parallel to the planned route 202 may be determined as the direction of the end point of the evasion route based on a position of the planned roue 202. The position of the planned route 202 closest to the end point of the evasion route may be determined, and the direction of the planned route 202 at this position may be determined as the direction of the end point of the evasion route.

In yet another embodiment, the direction of the end point of the evasion route may be determined as parallel to the direction of the movable body 200 at the position where the movable body 200 begins to deviate from the planned route 202. In yet another embodiment, the direction of the end point of the evasion route is toward a destination from the position where the movable body begins to evade.

As shown in FIG. 16B and FIG. 16C, the plurality of potential evasion route patterns is generated in a direction towards a destination or a specific point on the unnavigated planned route. Further, the direction of the end point of the evasion route 1604 is determined based on the direction of the plurality of potential evasion route patterns toward the destination or the specific point on the unnavigated planned route. In another embodiment, direction of the end point of the evasion route 1604 may be determined towards a selected point on the unnavigated planned route from the position where the movable body 200 begins to evade. In yet another embodiment, the direction of the end point of the evasion route may be determined parallel to a direction at the selected point on the unnavigated planned route.

Figure 17:
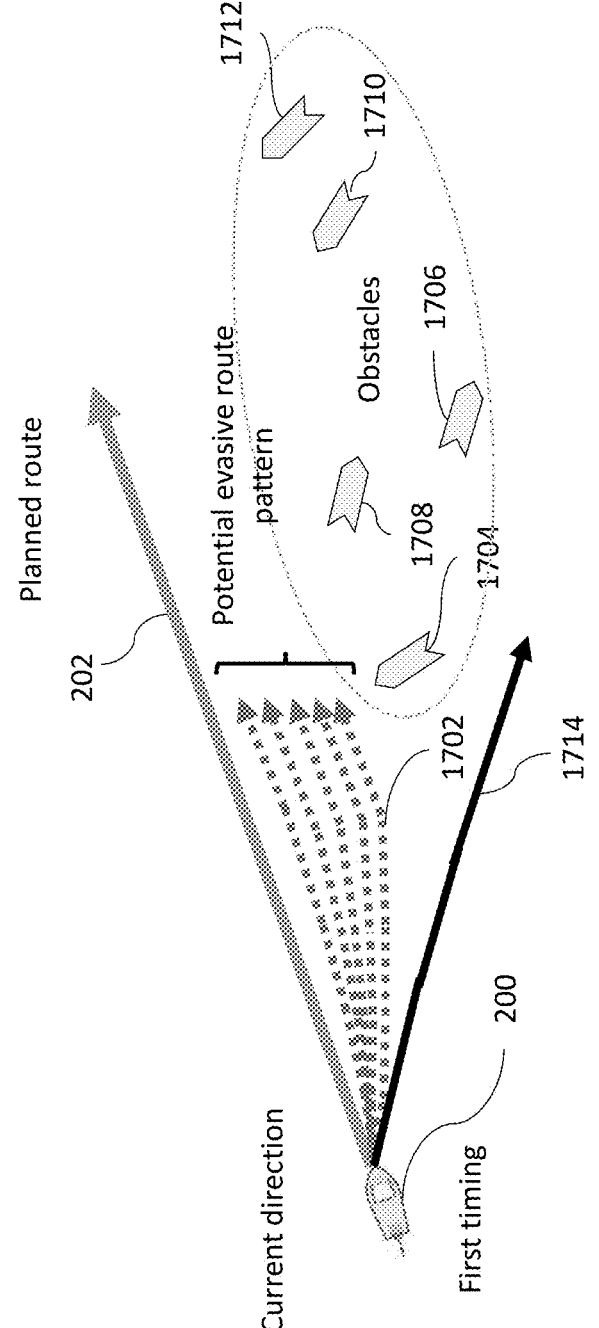
FIG. 17 illustrates determination of evasion route when the own ship approaches multiple obstacles, according to another embodiment of the present disclosure.

FIG. 17 illustrates determination of evasion route when the own ship approaches multiple obstacles, according to another embodiment of the present disclosure. In one embodiment, a plurality of obstacles 1704, 1706, 1708, 1710, 1712, and the like, are approaching to the moving body 200 on the planned route 202. In the embodiment, the congestion risk value for each obstacle along with the maximum collision risk value may be calculated. Further, the evasion route may be set based on the collision risk value and the maximum collision risk value. When the number of obstacles is large, it may be difficult to set the evasion route satisfying the above conditions in some situations. In this case, the direction of the end point of the evasion route may be determined so that the both risks (i.e., the collision risk value and the maximum collision risk value) fall below the respective threshold value, thereby avoiding the collision of the obstacles and the moving body 200. In one embodiment, the evasion route 1714 may be determined as the new route for the navigation of the moving body 200. However, the direction of the evasion route end point deviates from the conditions already described. Further, the calculation of the maximum collision risk value is described later.

Figure 18:
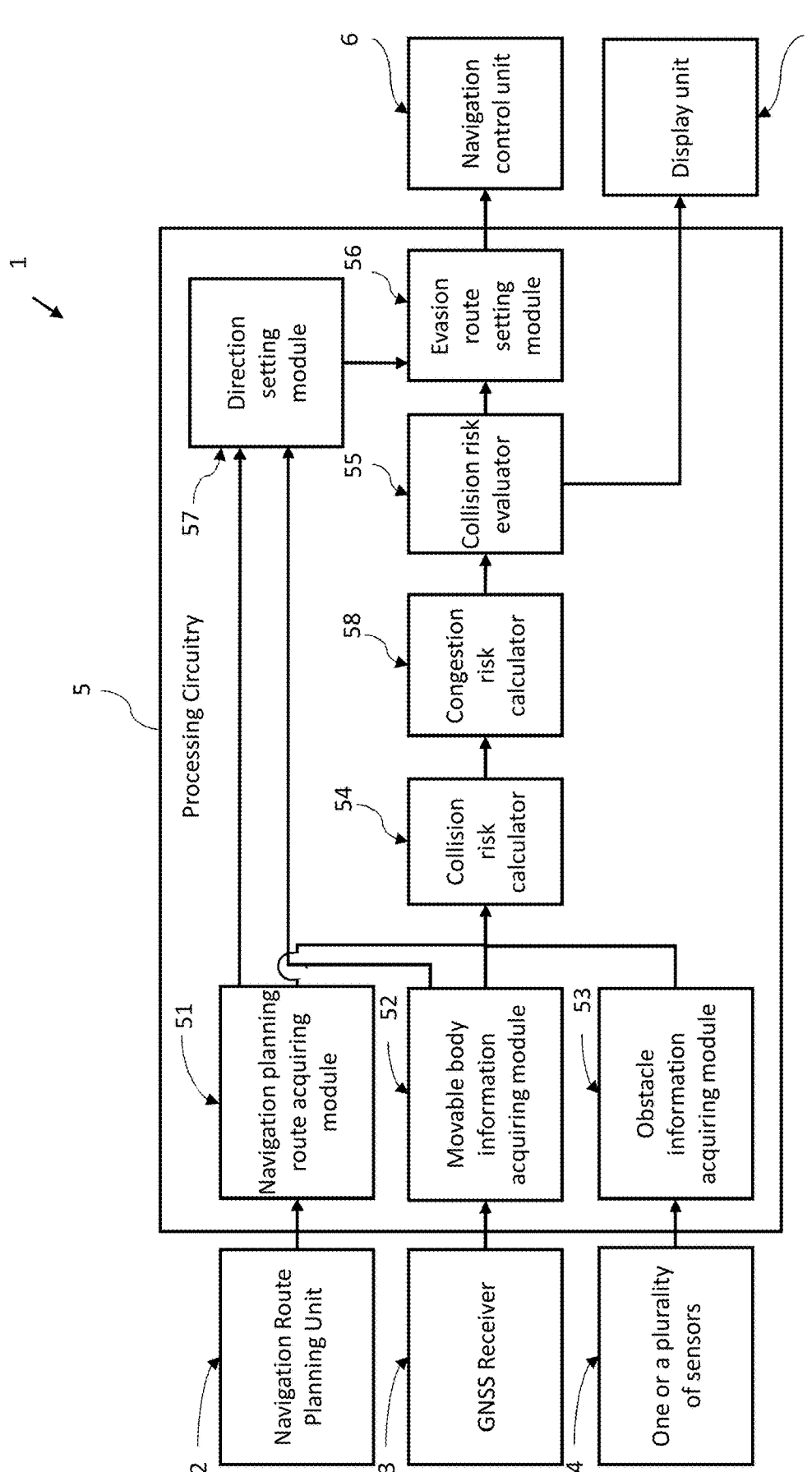
FIG. 18 is a block diagram illustrating the navigation planning system for safely navigating a movable body (or own ship), according to another embodiment of the present disclosure.

FIG. 18 is a block diagram illustrating the navigation planning system 1 for safely navigating the own ship 200, according to another embodiment of the present disclosure. The navigation system 1 includes the route planning module 2, the GNSS 3, the one or more sensor modules 4, the processing circuitry 5, the navigation control module 6, and the display module 7. The route planning module 2, the GNSS 3, and the one or more sensor modules 4 function in a similar manner as described in FIG. 1.

The processing circuitry 5 includes the planned route receiving module 51, the movable body information acquiring module 52, the obstacle information acquiring module 53, the collision risk calculator 54, a congestion risk calculator 58, the collision risk evaluator 55, an evasive route generator 56, and the direction setting module 57. The planned route receiving module 51, the movable body information acquiring module 52, the obstacle information acquiring module 53, the collision risk calculator 54, the collision risk evaluator 55, the evasion route generator 56, and the direction setting module 57 function in a similar manner as described in FIG. 1.

Figure 19A:
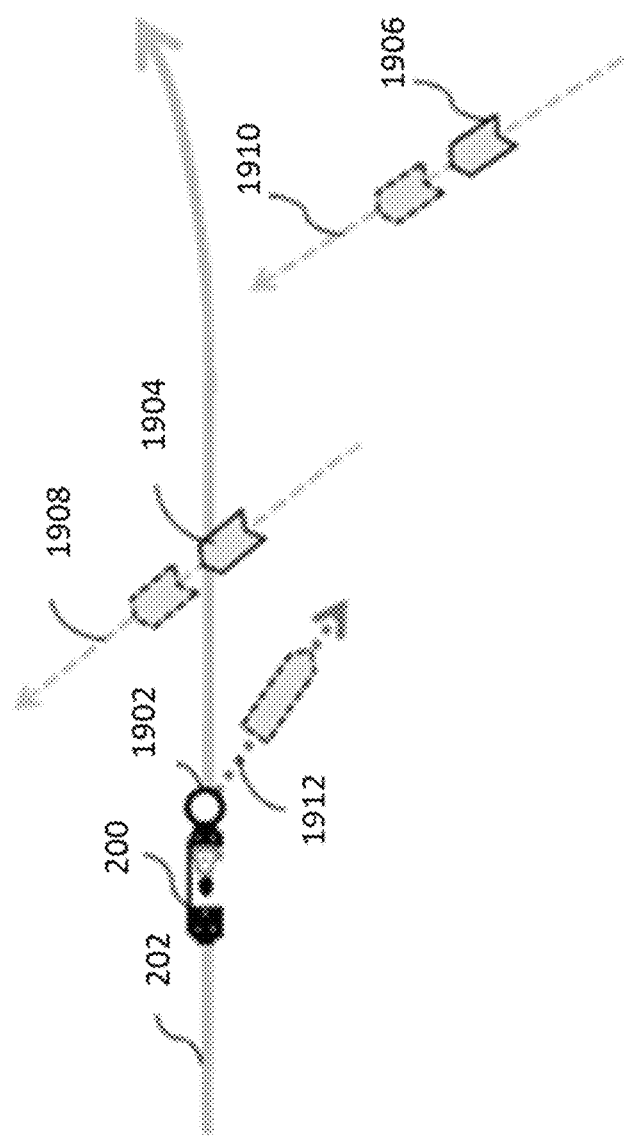
FIG. 19A and FIG. 19B, collectively, illustrates an evasive route set for the own ship to avoid the obstacle, according to another embodiment of the present disclosure.
Figure 19B:
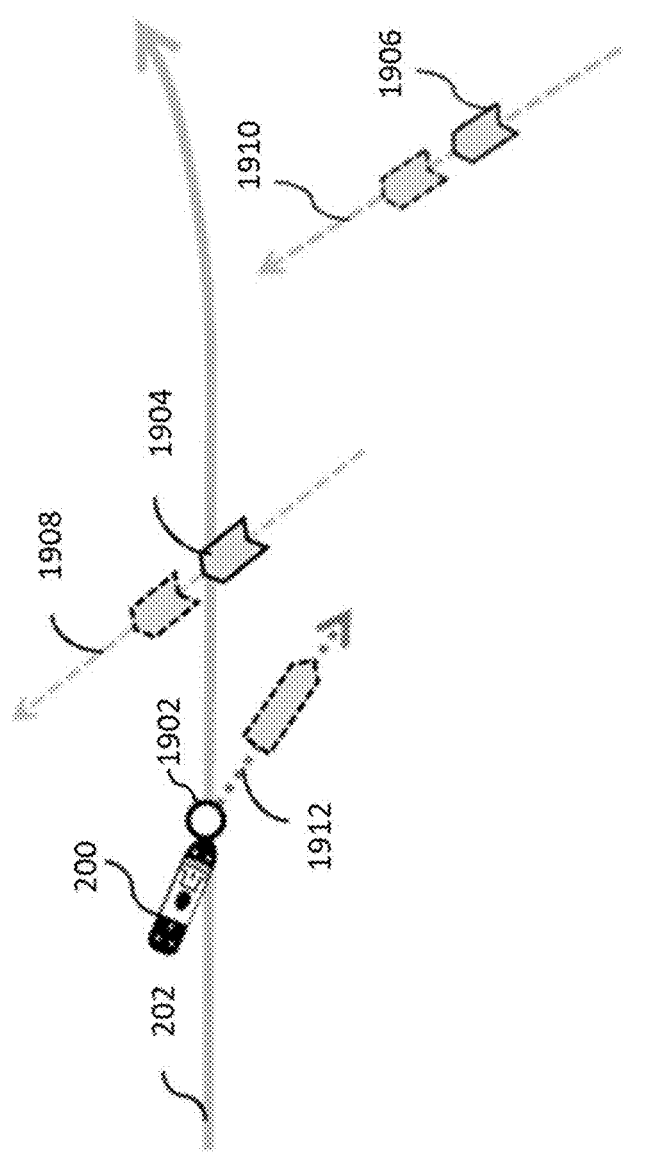

Referring to FIG. 19A and FIG. 19B, when the obstacle 1904 and the obstacle 1906 are traveling along the projected future routes 1908 and 1910, respectively, and the own vessel 200 continues to travel along the planned route 202, the projected future routes 1908 and 1910 and the planned route of own vessel 200 may interfere and collide at points as shown in the figure. In one embodiment, the multiple collision risk associated with the planned route is high, and the collision risk between own vessel 200 and the multiple obstacles 1904 and 1906 is high.

Referring again to FIG. 18, the congestion risk calculator 58 is operatively connected to the collision risk calculator 55. The congestion risk calculator 58 is configured to communicate with the collision risk calculator 55 to receive the plurality of collision risk values associated with the plurality of obstacles 1904 and 1906 along the planned route 202. Further, the congestion risk calculator 58 is configured to determine the congestion risk value associated with the planned route 202 along the current route direction based on the plurality of collision risk vales. The congestion risk value indicates the degree of simultaneous approach of the plurality of based on the collision risk corresponding to each of the obstacles included in the risk obstacle in the congestion region.

As an example of the calculation corresponding to the plurality of obstacles 1904 and 1906, the congestion risk calculator 58 determines the congestion risk values corresponding to the planned route 202 based on a logical sum of the plurality of collision risks associated with the plurality of obstacles. In this embodiment, the congestion risk calculator 58 determines the congestion risk value of the planned route 202 based on a logical sum of the plurality of collision risk values excluding the maximum collision risk value among the plurality of collision risks. In one embodiment, the congestion risk calculator 58 is further configured to calculate the congestion risk value based on the plurality of collision risk values excluding the maximum collision risk value and including a second large collision risk value among the plurality of collision risk values.

The term "logical sum" here refers to a logical sum based on the logic that is true when one or both of two propositions in a logical operation are true and false when both are false, that is, the logical sum based on the number of logic circuits and binary digits is 1 when one or both of the two inputs are 1, and 0 when both are 0. For example, if there are 4 obstacles: Obs (1), Obs (2), Obs (3), and Obs (4), and the collision risks are 0.3, 0.5, 0.7, and 0.9, respectively, the maximum collision risk is 0.9 of Obs (4), and the logical sum of 3 Obs (1) to Obs (3) excluding them is 0.7.

Figure 20:
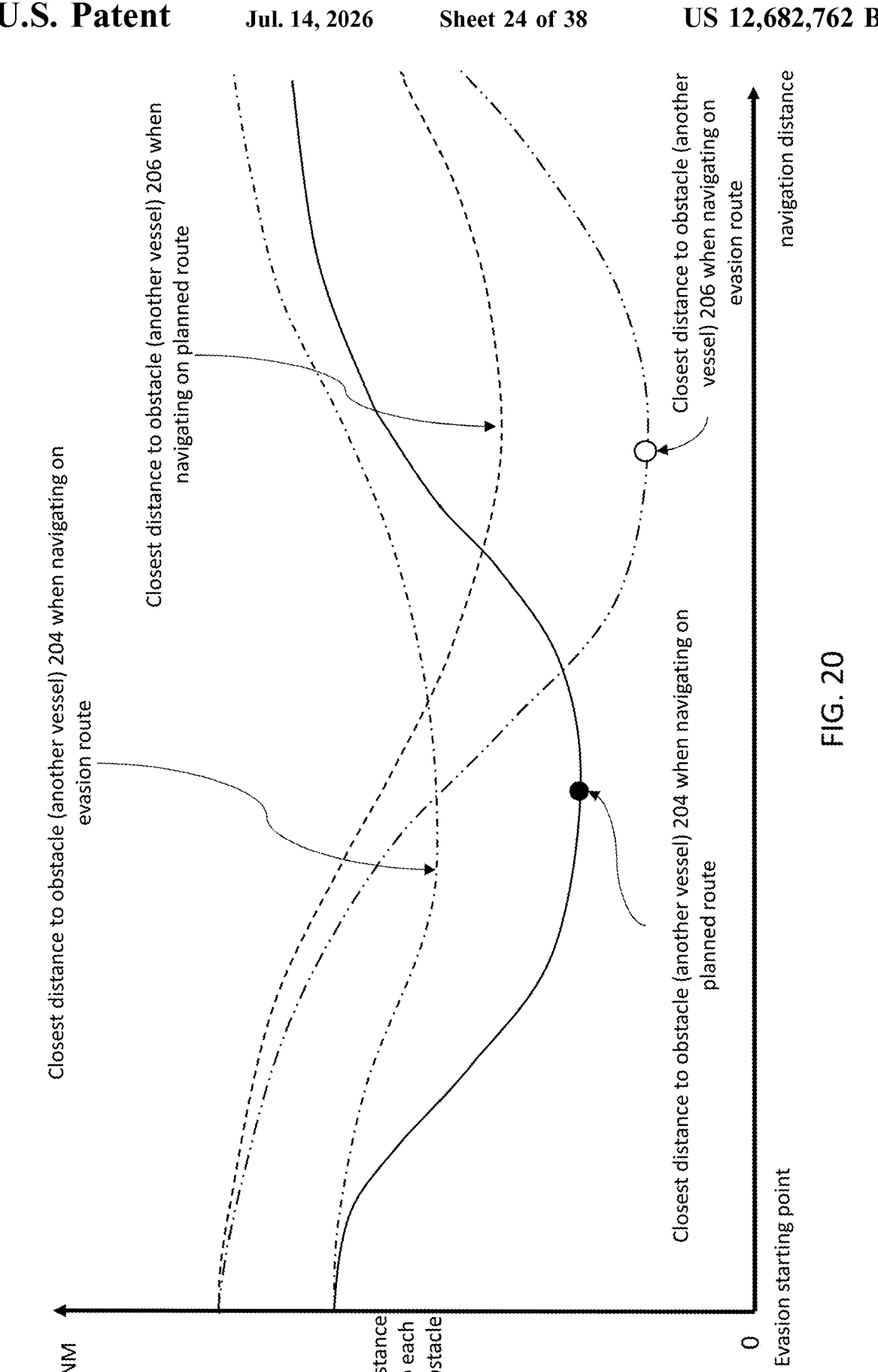
FIG. 20 is a diagram showing a change in a distance between the own vessel and the other vessels when the own vessel navigates the planned route and a change in the distance between the own vessel and the other vessels when the own vessel navigates an evasion route in an embodiment of the navigation planning system of the present invention.

FIG. 20 is a diagram showing a change in a distance between the own vessel and the other vessels when the own vessel navigates the planned route and a change in the distance between the own vessel and the other vessels when the own vessel navigates an evasion route in an embodiment of the navigation planning system of the present invention. In one embodiment, FIG. 20 shows the change in distance for the other vessel 1904 (i.e., solid line) and the other vessel 1906 (i.e., dashed line) when the own vessel 200 travels for a predetermined time from the evasion starting point at which it begins its evacuation on the planned route. Further, FIG. 20 shows the change in distance for the other vessel 1904 (i.e., dash-dot line) and the other vessel 1906 (i.e., dash-dot line) when the own vessel 200 travels for the predetermined time on the evasion route outside the planned route at the evasion starting point.

In one embodiment, when the own vessel 200 deviates from the planned route, the other vessel 1904 approach the vessel 200, and the distance between the two vessels approaches. At the position indicated by the black circle in FIG. 20, the two vessels approach the closest, and then the distance increases because the two vessels move away from each other. Subsequently, the other vessel 1906 approach the own vessel 200, and the distance is larger than that of the other vessel 1904 even when they approach the closest. That is, the collision risk with the own ship is small. Therefore, the maximum collision risk on the planned route is calculated based on the state where the other vessel 1904 and 1906 are closest to each other.

On the other hand, when the own vessel 200 evades on the evasion route, the other vessel 1904 approaches the own vessel 200, and the distance between the two, showing a change as shown by the dashed line in FIG. 20. The distance is larger than the distance when the own vessel 200 travels on the planned route. However, when the other vessel 1906 approaches, the nearest approach distance is closer to the distance indicated by the white circle and is smaller than the nearest approach distance to the other vessel 1904 when the own vessel 200 travels on the planned route. That is, the collision risk is high. Therefore, the maximum collision risk value of the evasion route is calculated based on the state where the other vessel 1906 and 1904 are closest to each other. This value is larger than the maximum risk value of the planned route.

In one embodiment, referring to FIG. 18, the collision risk calculator 55 calculates the collision risk value expected to be on the planned route 202 based on the movable body information of the own vessel 200 and the obstacle information for the other vessels 1904 and 1906, respectively.

The collision risk calculator 55 is configured to calculate the collision risk value associated with the obstacle (i.e., the other vessels 1904 and 1906) when traveling on the planned route based on the movable body information and the obstacle information. Assuming that the point of the own vessel 200 or the position on the planned route or where the own vessel 200 is currently located is the evasion starting point. Similarly, the collision risk value in the case of traveling on the evasion route for the predetermined time is calculated starting from the evasion starting point.

In the above description with reference to FIG. 20, the evasion is started from the position where the own vessel 200 is actually present on the planned route, and this is designated as the evasion starting point, but the evasion starting point is not limited to this, and the actual position on the planned route is affected by sea conditions, and there may be a discrepancy, but this may be the case.

The own vessel 200 may be any point on the unnavigated route of the planned route rather than the current location, or it may be a predicted location calculated based on the movable body information of the own vessel 200 based on the actual location described above.

Figure 21:
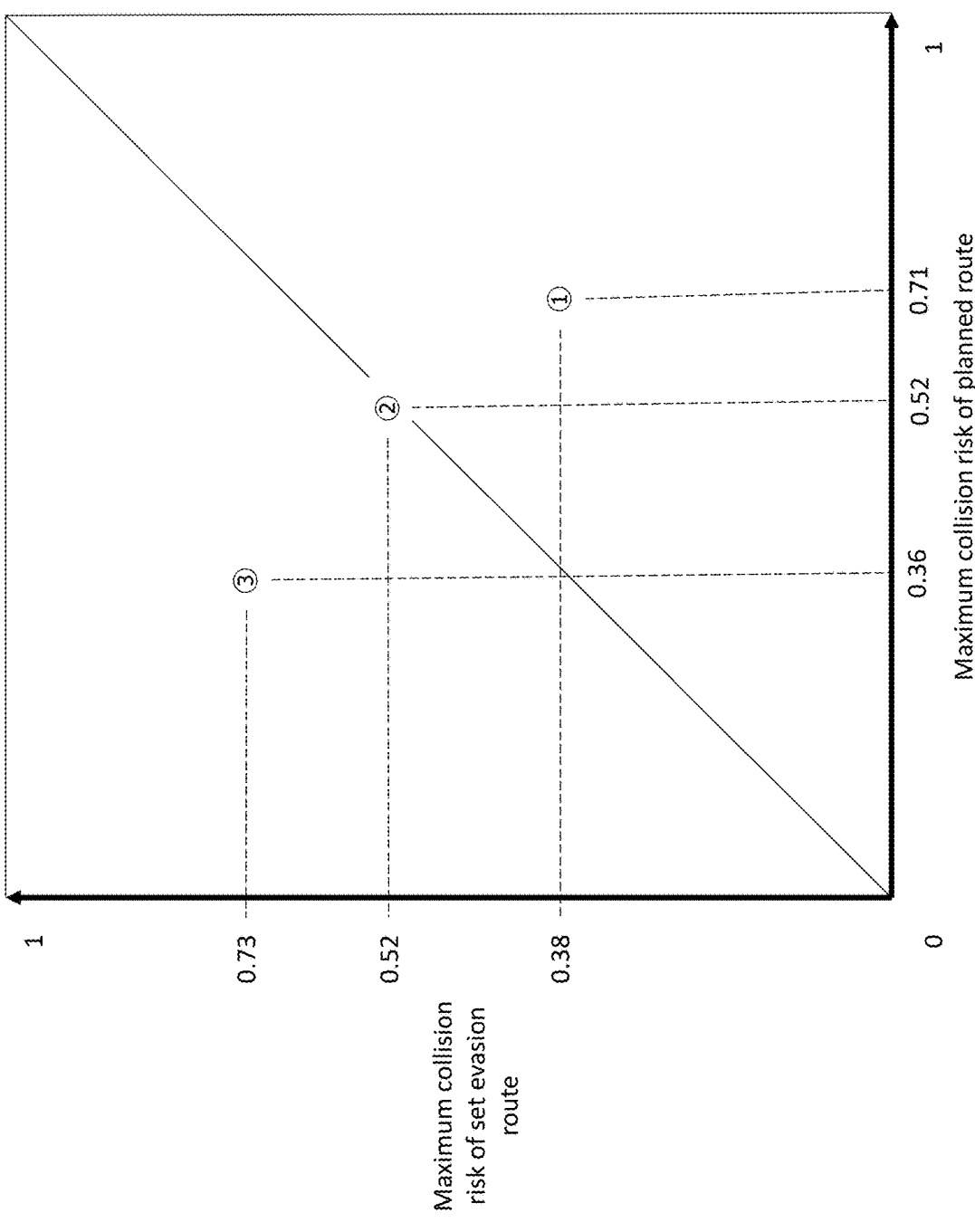
FIG. 21 is a diagram showing the relationship between a maximum collision risk when the vessel navigates the planned route and a maximum collision risk when the vessel navigates the evasion route in an embodiment of the navigation planning system of the present invention.

FIG. 21 is a diagram showing the relationship between a maximum collision risk when the vessel navigates the planned route and a maximum collision risk when the vessel navigates the evasion route in an embodiment of the navigation planning system of the present invention.

In the FIG. 21, three cases are shown here. That is, in case 1, the planned route maximum risk value is 0.71, that of the evasion route is 0.38, and that of the evasion route is smaller. In case 2, both are 0.52, and in case 3, they are 0.36 and 0.73.

In case 1, the planned route maximum collision risk value is significantly reduced by that of the evasion route maximum collision risk value, indicating that the collision risk value is reduced by navigating the evasion route rather than by navigating the planned route. In case 2, both values are the same, indicating that the collision risk value does not change whether the planned route is navigated or switched to the evasion route. In case 3, the evasion route maximum collision risk value is rather large, indicating that the collision risk value may be reduced by navigating the planned route as it is.

As described above, the navigation planning system 1 of the present invention may examine whether the collision risk value is reduced by the evasion route set for the purpose of Further, with reference to FIG. 22, a determination of the necessity of a navigation route change will be described in which the distance from the evasion starting point of the planned route and the evasion route is taken into account in addition to the comparison of the maximum collision risk.

Figure 22:
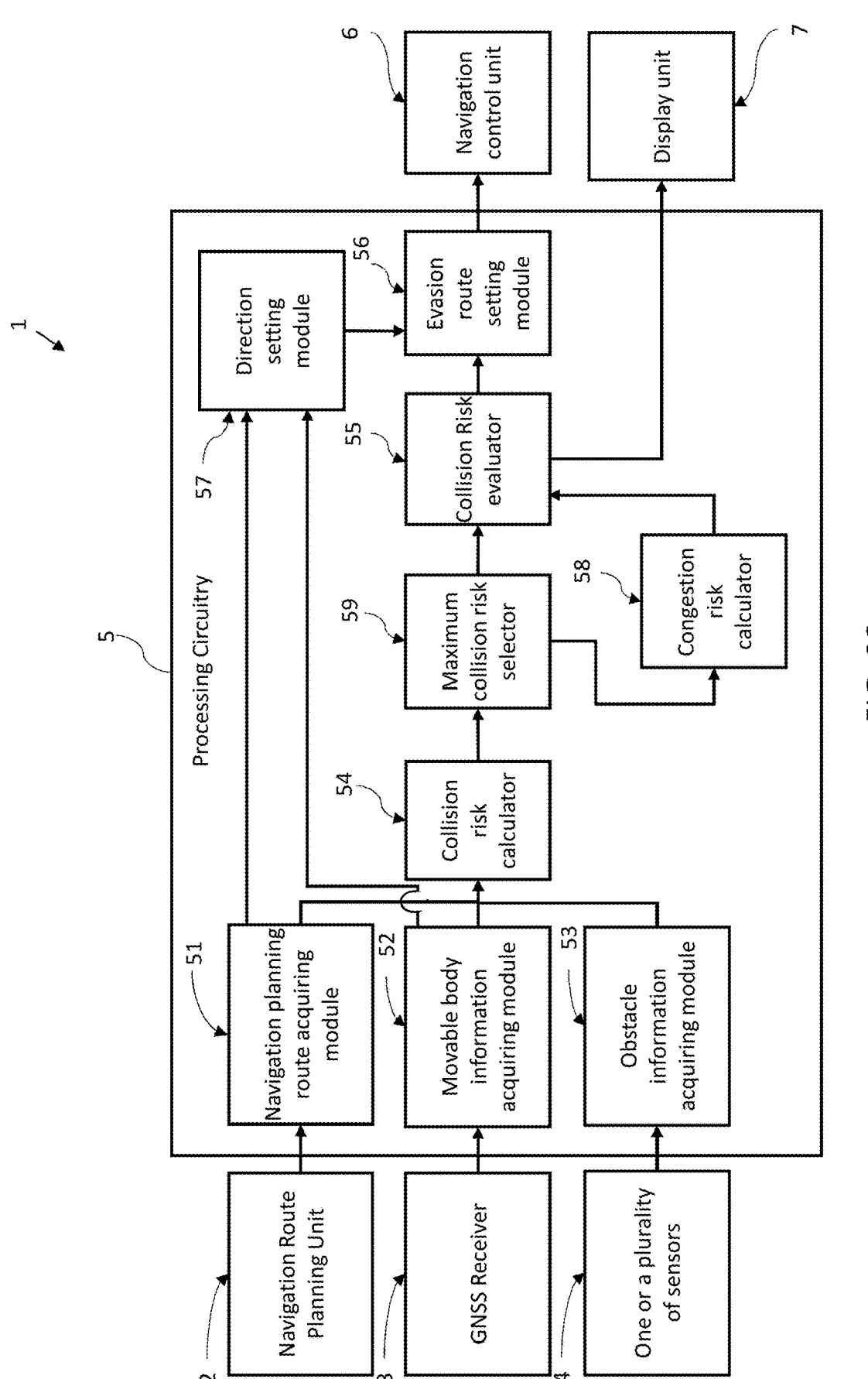
FIG. 22 is a block diagram illustrating the navigation planning system for safely navigating a movable body (or own ship), according to another embodiment of the present disclosure.

FIG. 22 is a block diagram illustrating the navigation planning system 1 for safely navigating the movable body (or own ship), according to another embodiment of the navigation planning system of the present invention. The difference from FIG. 18 is that the embodiment shown in FIG. 22 includes a maximum collision risk selector 59.

The maximum collision risk selector 59 selects an obstacle having the maximum collision risk value, i.e., the obstacle having the highest collision risk value, among the collision risk values for each of the plurality of obstacles calculated by the collision risk calculator 54. In this embodiment, as described above, the possibility of collision must be evaluated first for the obstacle having the maximum collision risk value, and an avoidance action must be taken as necessary.

On the other hand, for the obstacle other than the obstacle having the maximum collision risk value, the collision risk value caused by the degree of simultaneous approach, i.e., congestion risk value, is evaluated. In order to do this, for the obstacles having the collision risk value other than the maximum collision risk value, the collision risk value is input by the congestion risk calculator 54, and the congestion risk value is calculated.

In this embodiment, since the collision risk value with the obstacles having the maximum collision risk value is evaluated individually, it may be omitted but included. When the congestion risk value is calculated excluding the obstacles having the maximum collision risk value, it is more appropriate to calculate the congestion risk value by including the obstacles having the sub-maximum risk value following the maximum risk value.

In evaluating the collision risk value, it is better to calculate the congestion risk value based on the respective collision risk values of one or more other obstacles excluding the obstacles having the maximum collision risk value and evaluate the maximum collision risk value and the collision risk value separately. The first priority should be to avoid collisions with the obstacles having the maximum collision risk value. The second priority should be to consider other collision risk values when performing the collision avoidance, for example, the collision risk values with the obstacles including the obstacles having the second large collision risk value with higher collision risk value. However, the maximum collision risk value may be included in the calculation of the congestion risk value.

In one embodiment, the collision risk calculator 54 is configured to calculate the maximum collision risk value for each potential evasion route pattern from the plurality of potential evasion route patterns. Further, the congestion risk calculator 58 is configured to calculate the congestion risk value for each potential evasion route pattern from of the plurality of potential evasion route patterns. Furthermore, the evasion route selector 56 is configured to select the potential evasion route pattern, from the plurality of potential evasion route patterns, as the evasion route based on the maximum collision risk values and the congestion risks value associated with each potential evasion route pattern from the plurality of potential evasion route patterns.

Figure 23:
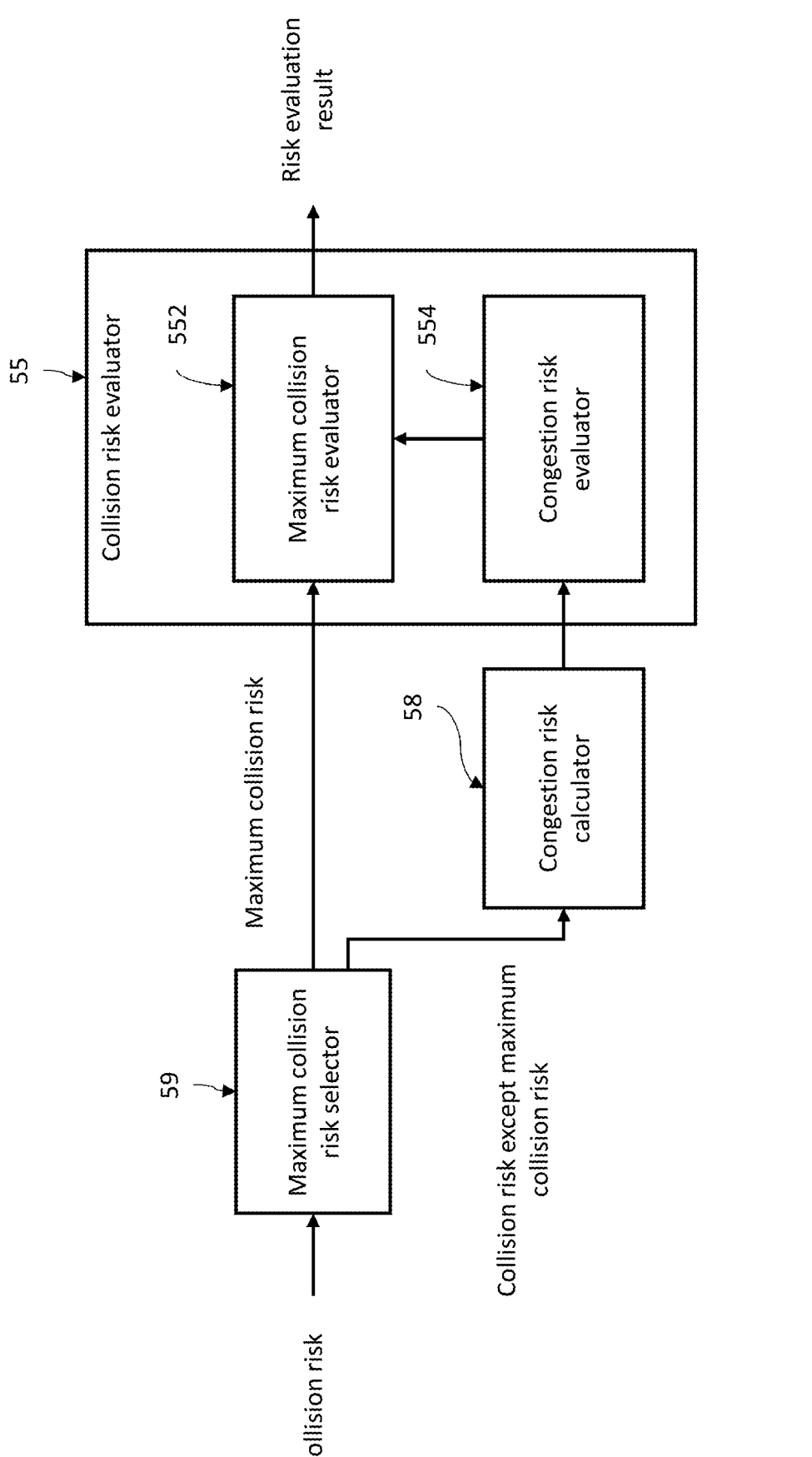
FIG. 23 is a an example of a collision risk evaluator and its related configuration, according to another embodiment of the present disclosure.

FIG. 23 is an example of a collision risk evaluator 55 and its related configuration, according to another embodiment of the present disclosure. In one embodiment, the maximum collision risk value selected by the maximum collision risk selector 59 is evaluated by comparing with a predetermined maximum collision risk threshold value in a maximum collision risk evaluator 552 of the collision risk evaluator 55.

On the other hand, the collision risk value excluding the maximum collision risk value is input to the congestion risk calculator 58 to calculate the congestion risk value, which is evaluated by comparing with a predetermined congestion risk threshold value in a congestion risk evaluator 554 of the collision risk evaluator 55.

In this embodiment, the collision risk evaluator 55 determines that there is no collision risk if both the maximum collision risk value and the congestion risk value are equal to or less than the respective predetermined threshold values, and outputs the risk evaluation result.

On the other hand, when the maximum collision risk value and the congestion risk value exceeds the respective predetermined maximum collision risk threshold values, it is judged that there is a collision risk. However, when the maximum collision risk value is below the predetermined threshold value, it may be judged that the urgent collision risk is small even when the congestion risk value is above the predetermined congestion risk threshold value.

As described above, the collision risk evaluator 55 may operate in conjunction with the congestion risk calculator 58 and acquires the congestion risk value associated with the planned route 202. The collision risk evaluator 55 further determines, based on the congestion risk value associated with the planned route 202, whether the own vessel 200 should avoid the planned route 202 or continue navigation along the planned route 202. The potential collision risk value may be determined by evaluating the congestion risk value of the planned route 202. If the congestion risk value is high, the own vessel 200 may navigate a different route, such as the evasion route 212, to avoid the planned route 202 and collision with the multiple obstacles 1904 and 1906.

In this embodiment, when the collision risk evaluator 55 determines that the own vessel 200 needs to evade planned route 202 based on the congestion risk value, the navigation planning system 1 prompts the vessel operator i.e., the user to navigate the own vessel 200 via the evasion route 1912 from the current location of the own vessel 200 or the predicted location where the own vessel may navigate in the future, i.e., the reference point (or waypoint) 1902 that serves as the origin, as shown in FIG. 19A and FIG. 19B. This may be assumed by various means, such as an on-screen warning display or audio.

In this embodiment, when the own vessel 200 is traveling according to the planned route 202, the intended route to be traveled is the planned route 202, but it will be apparent to those skilled in the art that the scope of the present invention is not limited thereto. As another embodiment, it may be envisioned that, without departing from the scope of the present invention, the route to be traveled when the own vessel 200 is traveling along the evasion route 1912 may be the evasion route 1912.

As another embodiment, when the own vessel 200 is traveling along the evasion route 1912, the collision risk calculator 54 may determine, based on the movable body information and the obstacle information, multiple collision risk values associated with the multiple obstacles 1904, 1906 along the evasion route 1912 (i.e., a route scheduled for evasion).

The congestion risk calculator 58 calculates the congestion risk value associated with evasion route 1912 based on the multiple collision risk values. For example, as described above, the congestion risk calculator 58 calculates the congestion risk value associated with the evasion route 1912 based on the logical sum of the multiple collision risk values associated with the multiple obstacles 1904 and 1906. In this embodiment, the congestion risk calculator 58 determines the congestion risk value of the evasion route 1912 based on the logical sum of the multiple collision risk values excluding the maximum collision risk value among the multiple collision risk values.

The collision risk evaluator 55 determines, based on the congestion risk value associated with the evasion route 1912, whether the own vessel 200 should deviate from the evasion route 1912 or continue on the evasion route 1912. The navigation planning system 1 repeats the process of avoiding collision with the plurality of obstacles 1904 and 1906 along the planned route traversed by the own vessel 200, i.e., the planned route 202 or the evasion route 1912, and recalculates and reconfigures the evasion route when the risk of collision is high on the planned route.

Figure 24:
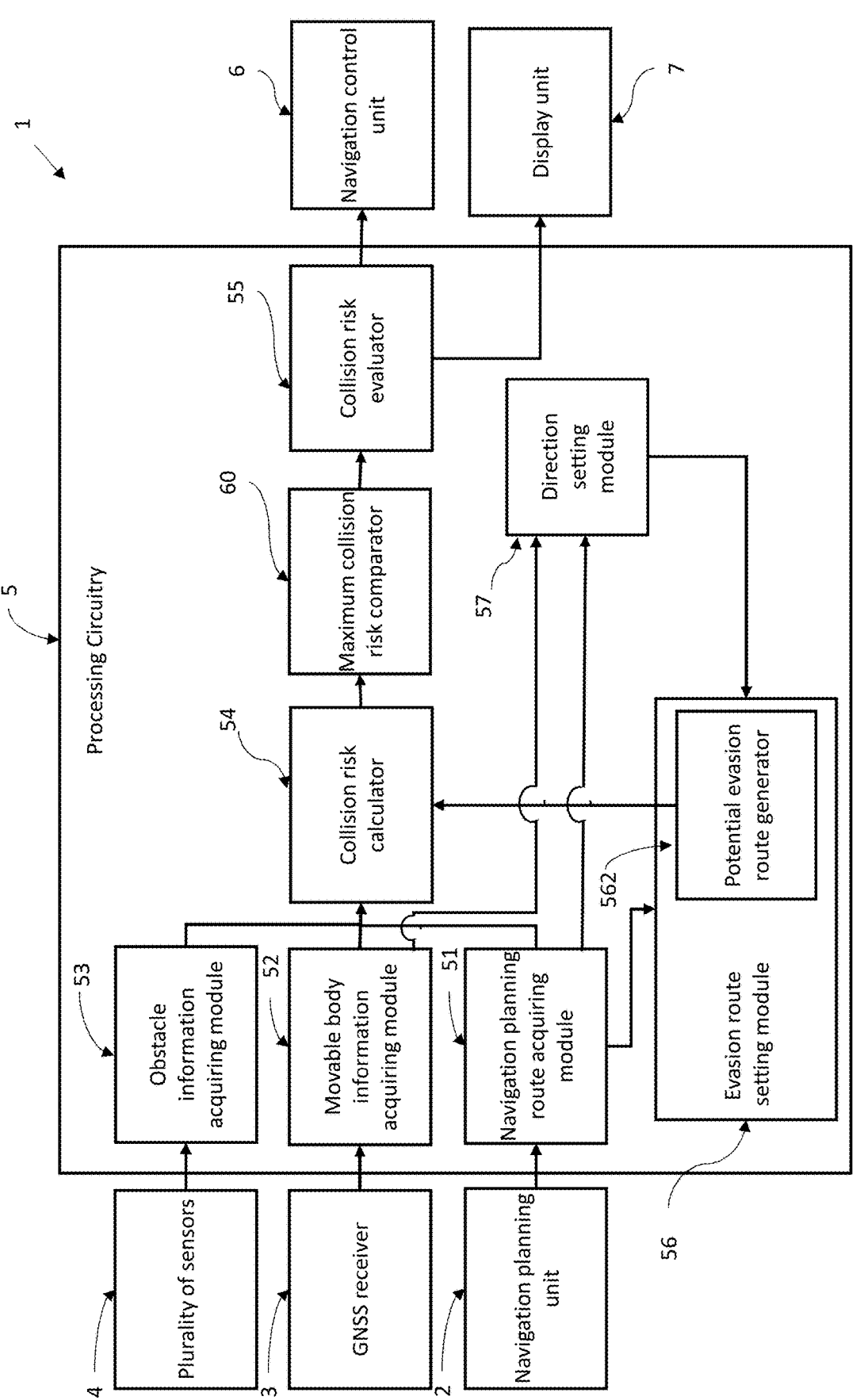
FIG. 24 is a block diagram illustrating the navigation planning system for safely navigating a movable body (or own ship), according to another embodiment of the present disclosure.

FIG. 24 is a block diagram illustrating the navigation planning system 1 for safely navigating the movable body (or own ship), according to another embodiment of the present disclosure. The navigation planning system 1 includes the route planning module 2, the GNSS 3, the one or more sensor modules 4, the processing circuitry 5, the navigation control module 6, and the display module 7. The route planning module 2, the GNSS 3, and the one or more sensor modules 4 function in a similar manner as described in FIG. 1.

The processing circuitry 5 includes the planned route receiving module 51, the movable body information acquiring module 52, the obstacle information acquiring module 53, the collision risk calculator 54, the collision risk evaluator 55, an evasive route generator 56, a direction setting module 57, and a maximum collision risk comparator 60. The planned route receiving module 51, the movable body information acquiring module 52, the obstacle information acquiring module 53, the collision risk calculator 54, and the collision risk evaluator 55, the evasion route setting module 56, and the direction setting module 57 function in a similar manner as described in FIG. 1.

The navigation planning system 1 includes the maximum collision risk comparator 60, and the collision risk value is input from the collision risk calculator 55 to the maximum collision risk comparator 60. The maximum collision risk comparator 60 calculates the maximum value of each of the collision risk value of the planned route and the evasion route, and compares them.

The maximum collision risk comparator 60 calculates a planned route maximum risk value and an evasion route maximum risk value. Further, the maximum collision risk comparator 60 compares the planned route maximum risk value and the evasion route maximum risk value. In the example of this embodiment shown here, since the maximum collision risk value for the other vessels 1906 on the evasion route of the vessel 200 is higher than the other vessels 1904 on the planned route 202, as described above, the comparison result is output to the collision risk evaluator 55.

Figure 25:
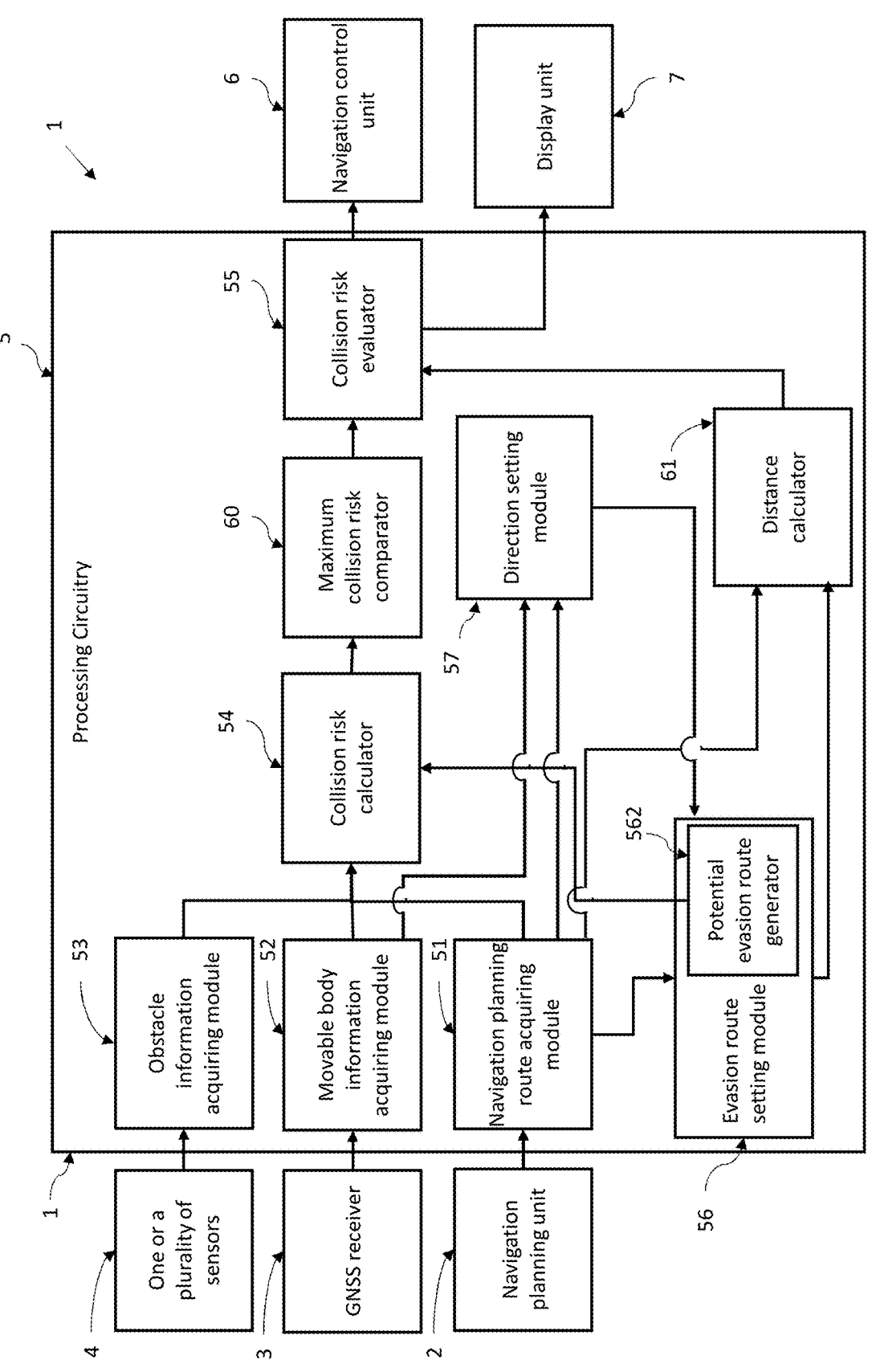
FIG. 25 is a block diagram illustrating the navigation planning system for safely navigating the movable body (or own ship), according to another embodiment of the present disclosure.

FIG. 25 is a block diagram illustrating the navigation planning system for safely navigating the movable body (or own ship), according to another embodiment of the present disclosure. The difference between the configuration of the navigation planning system 1, as shown in FIG. 23, and the configuration of the embodiment shown in FIG. 22 is that the processing circuitry 5 includes a distance calculator 61. The distance calculator 61 obtains information about the route from each of the navigation planning route acquiring module 51 and the evasion route setting module 56. The distance calculator 61 further calculates a distance from the evasion starting point of each of the planned route and the evasion route.

The distance from the evasion starting point may be calculated for each of the planned route and the evasion route as the distance traveled by the own vessel 200 when a predetermined time has elapsed since the start of the evasion.

As described above, the location of the evasion starting point may be set as the current location of the own vessel 200, or it may be assumed that the planned route is located on an unnavigated route.

The calculation result of the distance described above is output to the collision risk evaluator, and the necessity of the navigation route change is determined in conjunction with the result of the comparison between the planned route output from maximum collision risk comparator 60 and the maximum collision risk of each of the evasion routes.

Figure 26:
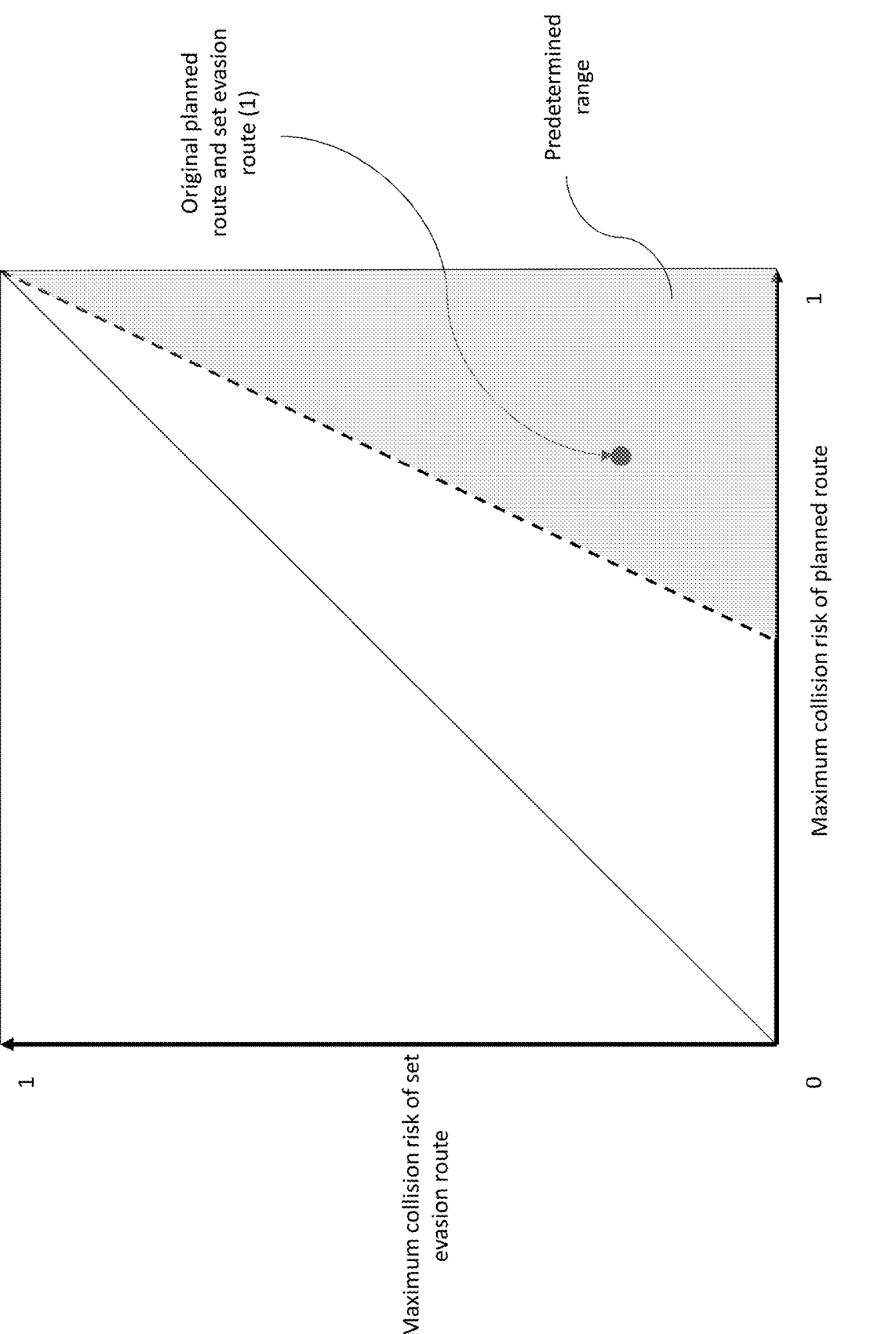
FIG. 26 is a diagram showing the relationship between the maximum collision risk when the vessel navigates the planned route and the maximum collision risk when the vessel navigates the evasion route in another embodiment of the navigation planning system of the present invention, and is a diagram showing that the maximum collision risk is within a predetermined base a second large range.
Figure 27:
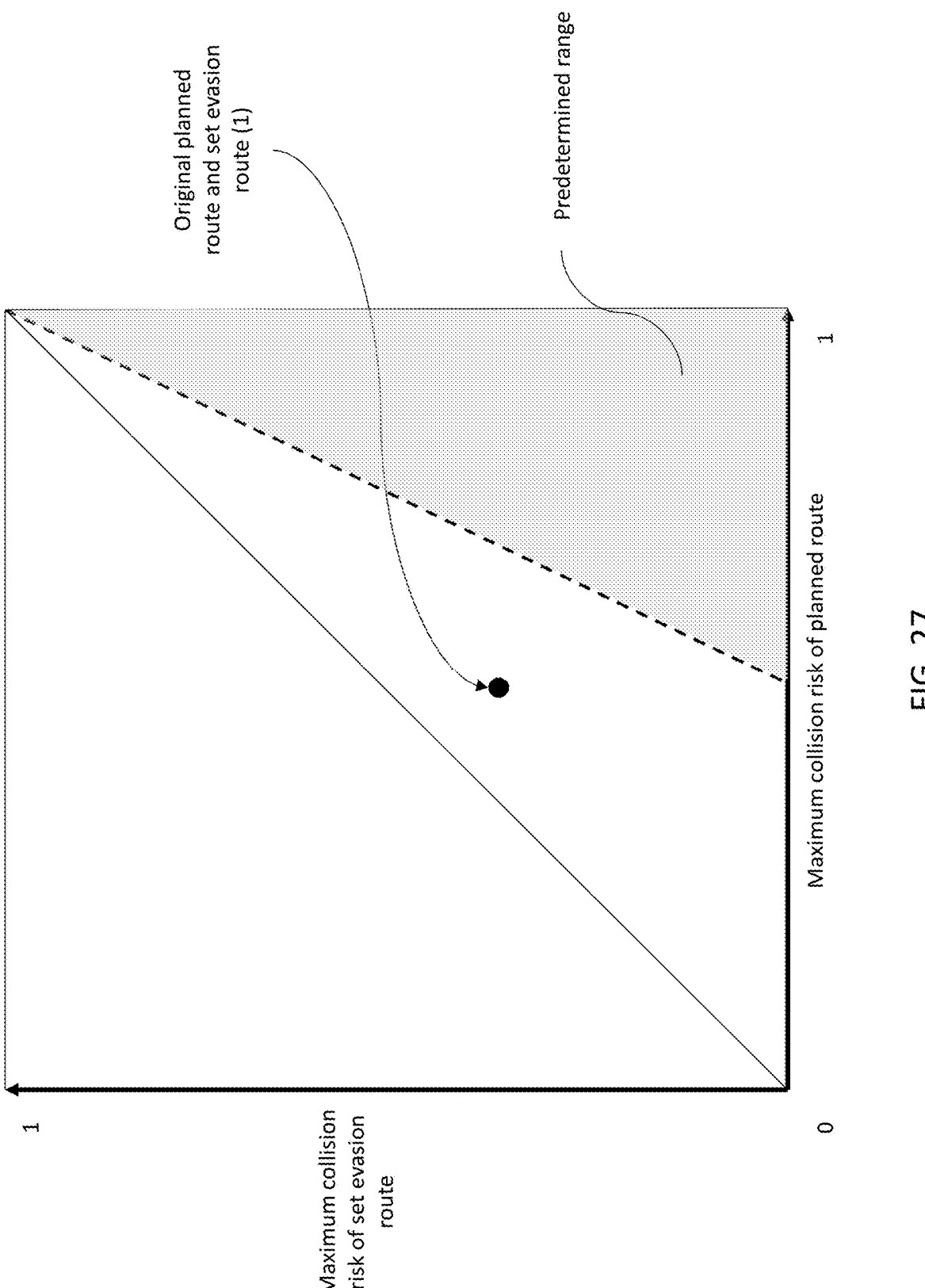
FIG. 27 is a diagram showing the relationship between the maximum collision risk when the vessel navigates the planned route and the maximum collision risk when the vessel navigates the evasion route in another embodiment of the navigation planning system of the present invention, and is a diagram showing that the maximum collision risk is outside the predetermined base the second large range.

FIG. 26 is a diagram showing the relationship between the maximum collision risk when the vessel navigates the planned route and the maximum collision risk when the vessel navigates the evasion route in another embodiment of the navigation planning system of the present invention, and is a diagram showing that the maximum collision risk is within a predetermined base a second large range. FIG. 27 is a diagram showing the relationship between the maximum collision risk when the vessel navigates the planned route and the maximum collision risk when the vessel navigates the evasion route in another embodiment of the navigation planning system of the present invention, and is a diagram showing that the maximum collision risk is outside the predetermined base the second large range. In one embodiment, FIG. 26 shows the position in the diagram showing the relationship between the maximum collision risk when the vessel navigates the planned route and the maximum collision risk when the vessel navigates the evasion route in a predetermined reference range. FIG. 27 shows that the position is outside the predetermined reference range. That is, a gray shaded area in the diagram shows an example of the predetermined reference range, and the relationship, between the maximum collision risk when the vessel navigates the planned route and the maximum collision risk when the vessel navigates the evasion route, indicated by a black circle is within the predetermined reference range. The reference range indicates that the maximum collision risk of the evasion route (1) set for the planned route is sufficiently low, and that it is better to switch the route to the evasion route (1) even if the difference between the congestion risk described later and the distance between the planned route and the evasion route (1) is large in order to ensure a higher level of safety if it is within the reference range.

On the other hand, in FIG. 27, the black circle indicating the relationship between the planned route maximum collision risk value and the evasion route (2) maximum collision risk value is located in the lower right area of the figure, i.e., the position where the risk is reduced, but is not within base a second large range. That is, although the maximum collision risk value may be reduced by changing the route to the evasion route (2), a large reduction like that of the evasion route (1) may not be expected.

In this case, the decision not to perform the navigation route change to the evasion route (2) may be made, but the necessity of the above decision may be made by taking further factors into consideration. In the positional embodiment shown in FIG. 25, the distance between the evasion starting point and the end point of the evasion route is calculated, and this decision is also made in addition to the decision factors. Although the effect of risk reduction by performing navigation route change to the evasion route (2) is not large, there is an advantage that the planned route may be returned to the planned route at an early stage.

Figure 28:
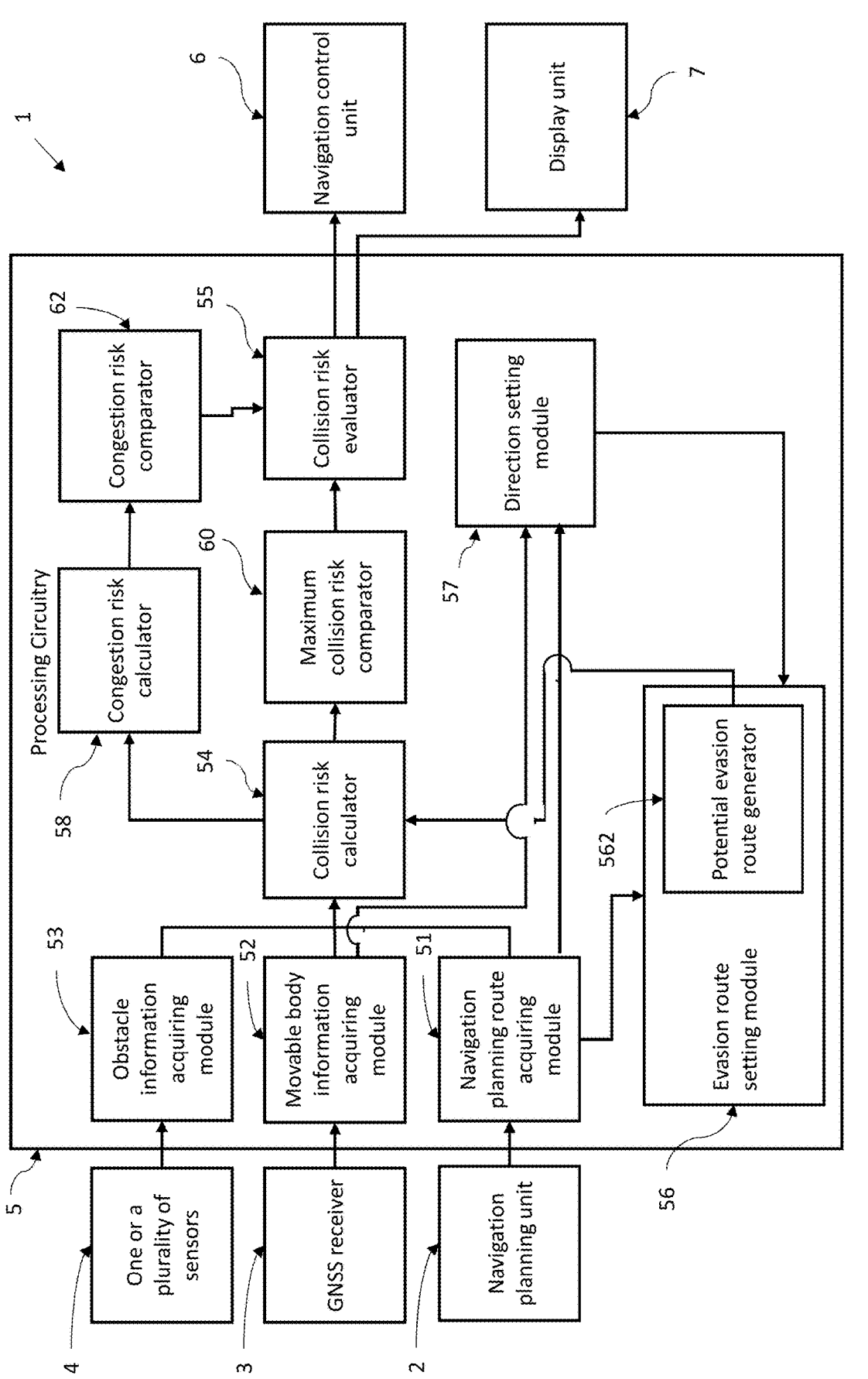
FIG. 28 is a block diagram illustrating the navigation planning system for safely navigating the movable body (or own ship), according to another embodiment of the present disclosure.

FIG. 28 is a block diagram illustrating the navigation planning system for safely navigating the movable body (or own ship), according to another embodiment of the present disclosure. In the present embodiment, as shown in FIG. 28, the configuration is different from that of the embodiment shown in FIG. 24 in that the processing circuitry 5 includes the congestion risk calculator 58 and a congestion risk comparator 62 are provided, and the result is used for the determination of the necessity of the risk evaluator.

The congestion risk calculator 58 is operatively connected to the collision risk calculator 54 and is configured to communicate with the collision risk calculator 54 to receive a plurality of the collision risks for the plurality of the obstacle (the other vessel) 1704 and other obstacles (the other vessels) 1706 to 1712 along the planned route 202 shown in FIG. 17.

The congestion risk calculator 58 is configured to determine the congestion risk value associated with the planned route 202 along the current route direction based on the plurality of the collision risks. The congestion risk value indicates the degree of simultaneous approach of the obstacle included in the congestion risk area based on the collision risk corresponding to each of the obstacles included in the obstacle in the congestion area.

The congestion risk calculator 58 determines the congestion risk corresponding to the planned route 202 based on a value of the logical sum of the collision risk values as an example of the calculation corresponding to the plurality of the obstacles 1704 and the obstacles 1706 to 1712. In this embodiment, the congestion risk calculator 58 determines the congestion risk value of the planned route 202 based on the value of the logical sum of the plurality of the collision risk values excluding the maximum collision risk value, that is, the collision risk value for the obstacle 1704, among the plurality of the collision risk values.

The term "logical sum" as used herein refers to a logical sum based on the logic that is true when one or both of two propositions in a logical operation are true and false when both are false, that is, the logical sum of a logical circuit or a binary numeric value has an output of 1 when one or both of the two inputs are 1 and 0 when both are 0. For example, if there are 4 obstacle Orbs (1), Obs (2), Obs (3), and Obs (4), and the collision risk is 0.3, 0.5, 0.7, and 0.9, respectively, the collision risk of maximum is 0.9 of Obs (4), and the logical sum of 3 Obs (1) through Obs (3) excluding them is 0.7.

On the other hand, for the cases other than the obstacle with the maximum collision risk value, the collision risk value caused by the degree of simultaneous approach, that is, the congestion risk value, is evaluated. In order to do this, for the set of obstacles with the collision risk value other than maximum collision risk value, the collision risk value is input by the congestion risk calculator 58, and the congestion risk value is calculated.

In the present embodiment, the collision risk value associated with the obstacle having the maximum collision risk is evaluated individually, and may be excluded. When the congestion risk value is calculated excluding the obstacle having the maximum collision risk value, the congestion risk value is calculated appropriately by including the obstacle having a second large maximum risk value following the maximum collision risk value.

In evaluating the collision risk value, it is better to calculate the congestion risk value based on the collision risk value of one or more other obstacles excluding the obstacle having the maximum collision risk value, and evaluate the maximum collision risk value and the congestion risk value separately. In one embodiment, the priority is given to avoiding collisions with the obstacle having the maximum collision risk value.

Furthermore, consider that other collision risk values, such as the collision risk values with the obstacle including the obstacle having the second large maximum collision risk, which is the next highest the collision risk, when performing collision avoidance. The configuration shown in FIG. 28 is a configuration according to this. However, the maximum collision risk value may be included in the calculation of the congestion risk.

Figure 29:
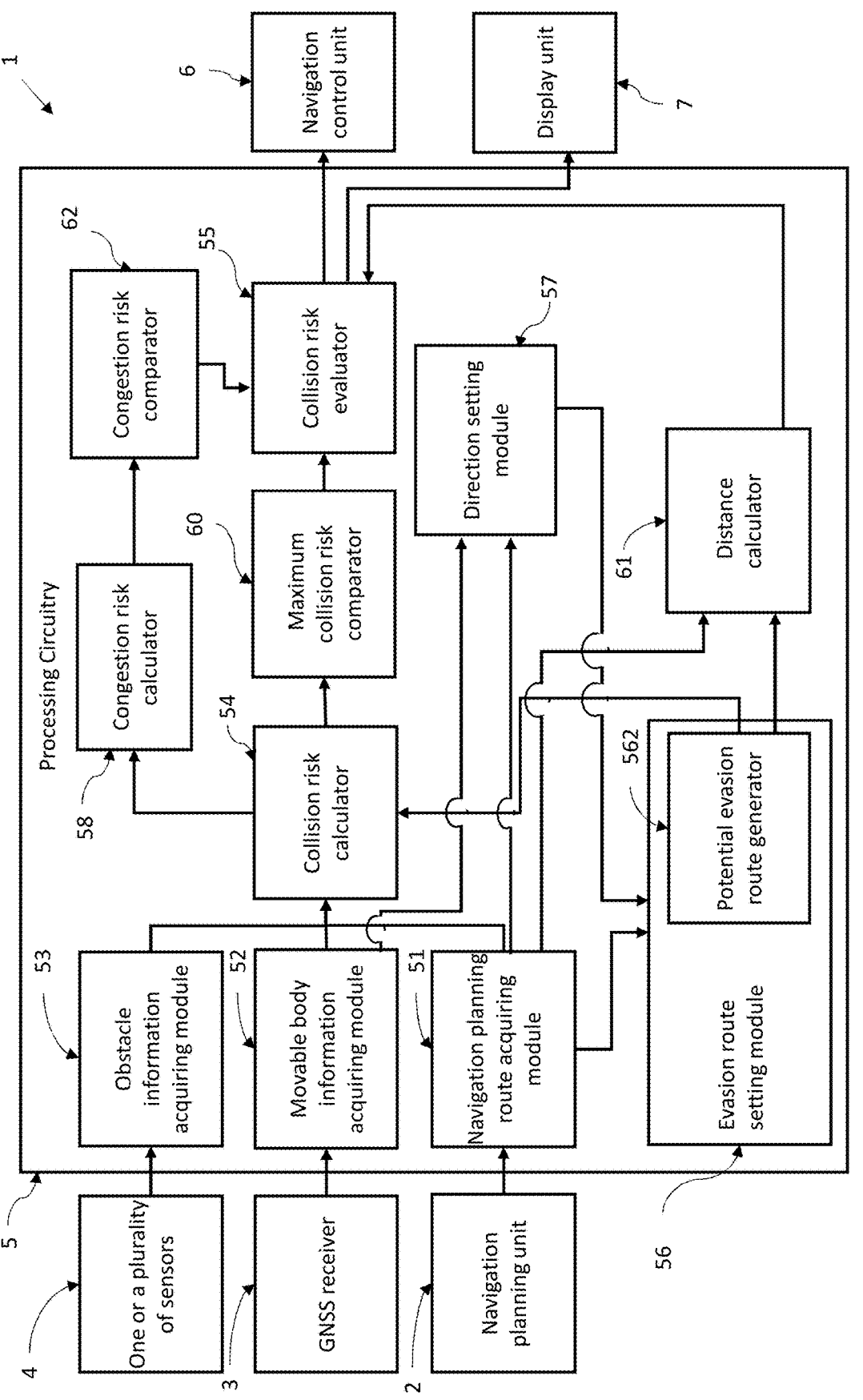
FIG. 29 is a block diagram illustrating the navigation planning system for safely navigating the movable body (or own ship), according to another embodiment of the present disclosure.

FIG. 29 is a block diagram illustrating the navigation planning system for safely navigating the movable body (or own ship), according to another embodiment of the present disclosure. An embodiment of the navigation planning system of the present invention shown in FIG. 29, the processing circuitry 5 includes the distance calculator 61 provided in the embodiment shown in FIG. 25, and the congestion risk calculator 58 and the congestion risk comparator 62 provided in the embodiment shown in FIG. 28. The collision risk evaluator 55 collectively determines the navigation route change with respect to the result of the comparison between the maximum risk value comparator 60 shown at the beginning, the result of the comparison between the congestion risk comparator 62, and the difference between the distances of the planned route and the evasion route calculated by the distance calculator 61.

Figure 30:
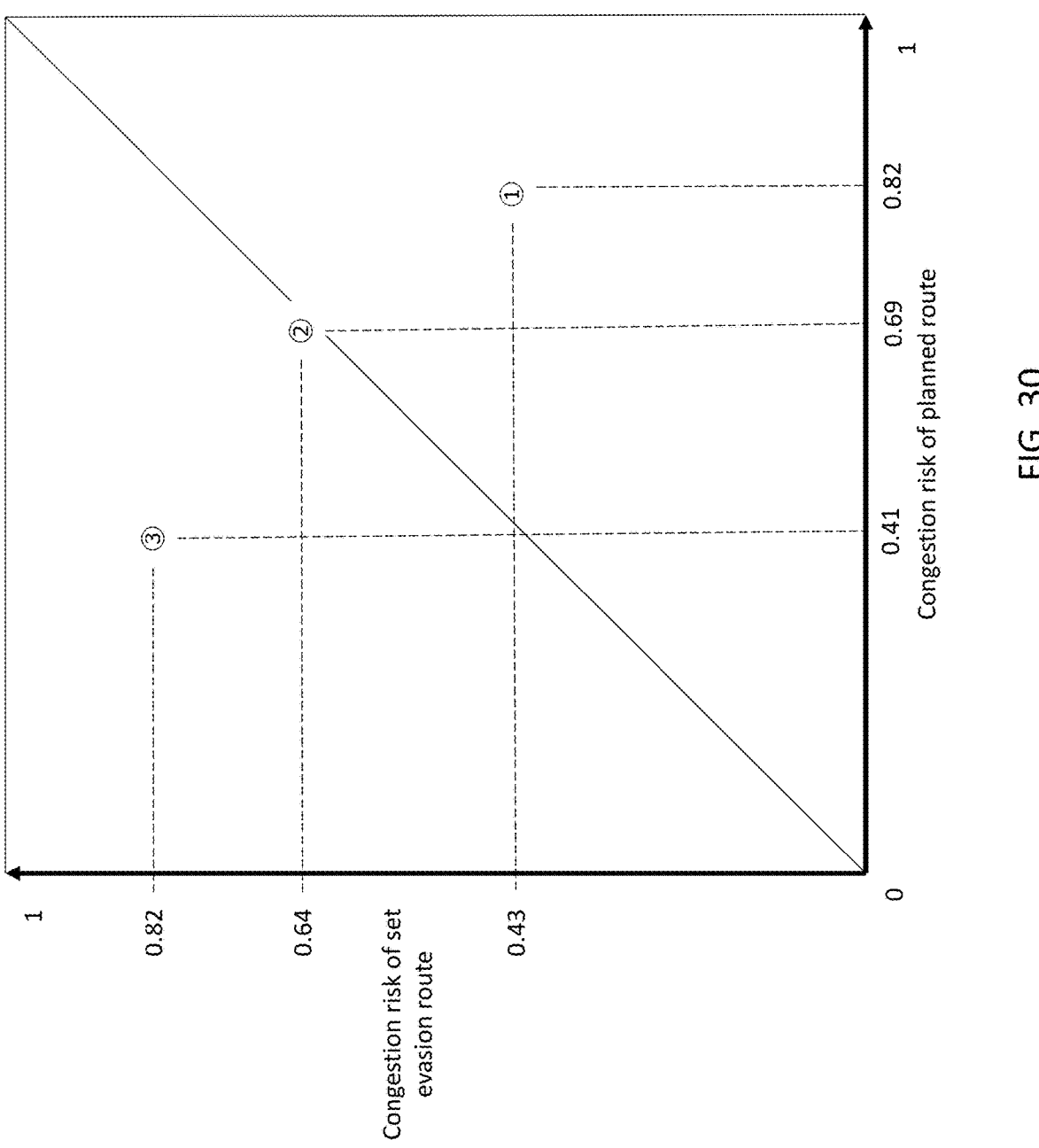
FIG. 30 is a diagram showing a relationship between the congestion risk when the vessel navigates the planned route and the congestion risk when the vessel navigates the evasion route in another embodiment of the navigation planning system of the present invention.

FIG. 30 is a diagram showing a relationship between the congestion risk when the vessel navigates the planned route and the congestion risk when the vessel navigates the evasion route in another embodiment of the navigation planning system of the present invention. In one embodiment, FIG. 30 shows the relationship between the congestion risk when the vessel 200 navigates on the planned route and the congestion risk when the vessel 200 navigates on the evasion route, and similarly to the maximum collision risk, the relationship is divided into 3 relationships of 1-3 according to the size of the values of both.

Therefore, the navigation planning system 100 of the present invention enables the vessel operator, that is, the operator who operates the vessel, to navigate the vessel further safely 200 by avoiding collision with a plurality of surrounding obstacles such as the other vessels, terrain, etc., in the planned route (the planned route 202 or the evasion route 212) displayed on the screen of the display unit 7 and the evasion route (the evasion route 212 or the other evasion route) generated.

FIG. 31A, FIG. 31B, FIG. 31C and FIG. 31D, collectively, represent a flow chart illustrating a navigation route planning method 3100 in accordance with an embodiment of the present disclosure.

At step 3102, the planned route information acquiring module 51 acquires the planned route 202 indicating the navigation planning route of the movable body 200 on a water.

At block 3104, the movable body information acquiring module 52 acquires the movable body information including the position, the moving direction, and the speed of the movable body 200.

At block 3106, the obstacle information acquiring module 53 acquires the obstacle information including the position, the moving direction, and the speed of each obstacle from the plurality of obstacles located in the surrounding area of the movable body 200.

At block 3108, the collision risk calculator 54 calculates the collision risk value indicating a risk level of collision between the movable body 200 and an obstacle from the plurality of obstacles based on the movable body information and the obstacle information.

At block 3110, the collision risk evaluator 55 determines a necessity of evasion based on comparing the collision risk value with a threshold value.

At block 3112, the evasion route setting module 56 determines the evasion route different from the planned route 202 when the collision risk evaluator 55 determines the necessity of the evasion. The movable body 200 is oriented in a reference direction at an end point of the evasion route.

In one embodiment, at block 3114, the potential evasion route pattern generator 562 generates a plurality of potential evasion route patterns different from the planned route 202 between an evasion starting point on an unnavigated planned route and the end point out of the planned route 202.

At block 3116, the route pattern estimator 564 evaluates the collision risk value of each potential evasion route pattern from the plurality of potential evasion route patterns. Further, at block 3118, the direction setting module 57 determines a direction of the end point of each potential evasion route pattern from the plurality of potential evasion route patterns based on the planned route and the movable body information.

At block 3120, the evasion route selector 566 selects a potential evasion route pattern from the plurality of potential evasion route patterns based on the collision risk value. The potential evasion route pattern is selected as the evasion route for the movable body 200.

Figure 31C:
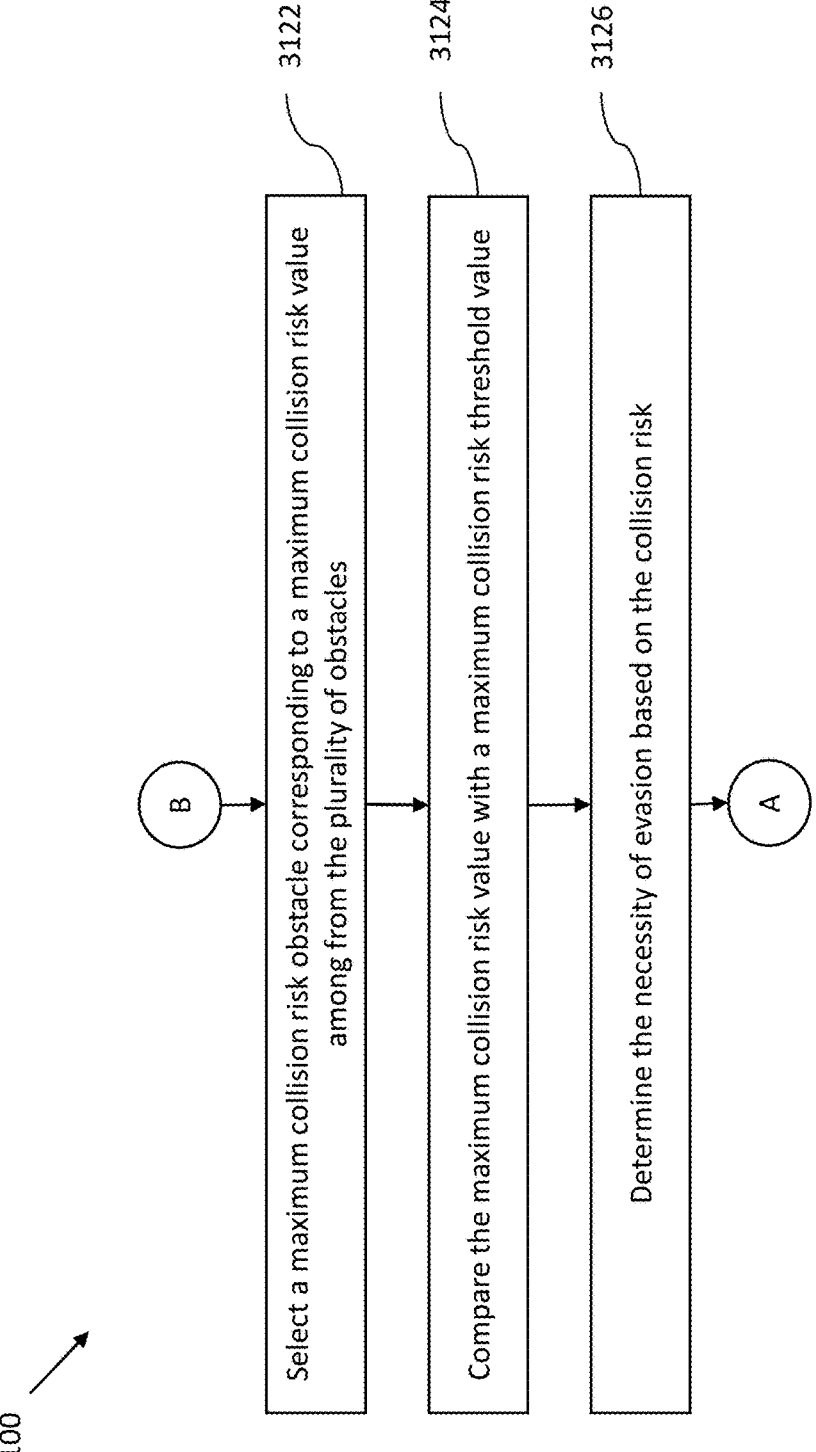

As shown in FIG. 31C, at block 3122, the maximum collision risk selector 59 selects the maximum collision risk obstacle corresponding to the maximum collision risk value from the plurality of obstacles.

At block 3124, the maximum collision risk evaluator 552 compares the maximum collision risk value with a maximum collision risk threshold value. Further, at block 3126, the necessity of the evasion is determined based on the comparison of the maximum collision risk value and the maximum collision risk threshold value. Further, the plurality of potential evasion route patterns are generated, and the evasion route (i.e., the potential evasion route pattern) is determined as described above.

As shown in FIG. 31D, at block 3128, the congestion risk calculator 58 calculates the congestion risk value indicating a degree of approaching the plurality of obstacles simultaneously based on the collision risk value between the movable body 200 and each obstacle from the plurality of obstacles.

At block 3130, the collision risk evaluator 55 determines the necessity of evasion based on the collision risk value and the congestion risk value. Further, the plurality of potential evasion route patterns are generated, and the evasion route (i.e., the potential evasion route pattern) is determined as described above.

REFERENCE SIGNS LIST

1: Navigation planning system
2: Route planning module
3: GNSS Receiver
4: One or more sensor modules
51: Planned route receiving module
52: Movable body information acquiring module
53: Obstacle information acquiring module
54: Collision risk calculator
55: Collision risk evaluator
56: Evasion route setting module
57: Direction setting module
58: Congestion risk calculator
59: Maximum collision risk selector
60: Maximum collision risk comparator
61: Distance calculator
62: Congestion risk comparator
562: Potential route pattern generator
564: Route pattern estimator
566: Evasive route selector
200: Movable body
202: Planned route
212: Evasion route
204: Obstacle It is to be understood that not necessarily all objectives or advantages may be achieved in accordance with any particular embodiment described herein. Thus, for example, those skilled in the art will appreciate that certain embodiments may be configured to operate in a manner that achieves or optimizes one advantage or group of advantages as taught herein without necessarily achieving other objects or advantages as may be taught or suggested herein.

All processes described herein may be embodied in, and fully automated via, software code modules executed by a computing system that includes one or more computers or processors. The software code modules may be stored in any type of non-transitory computer-readable medium or other computer storage device. Some or all methods may be embodied in specialized computer hardware.

Many other variations other than those described herein will be apparent from this disclosure. For example, depending on the embodiment, certain actions, events, or functions of any of the algorithms described herein may be performed in different sequences, and may be added, merged, or excluded altogether (e.g., not all described actions or events are required to execute the algorithm). Moreover, in certain embodiments, operations or events are performed in parallel, for example, through multithreading, interrupt handling, or through multiple processors or processor cores, or on other parallel architectures, rather than sequentially. In addition, different tasks or processes can be performed by different machines and/or computing systems that can work together.

The various exemplary logical blocks and modules described in connection with the embodiments disclosed herein can be implemented or executed by a machine such as a processor. The processor may be a microprocessor, but alternatively, the processor may be a controller, a microcontroller, or a state machine, or a combination thereof. The processor can include an electrical circuit configured to process computer executable instructions. In another embodiment, the processor includes an application specific integrated circuit (ASIC), a field programmable gate array (FPGA), or other programmable device that performs logical operations without processing computer executable instructions. The processor can also be implemented as a combination of computing devices, e.g., a combination of a digital signal processor (DSP) and a microprocessor, a plurality of microprocessors, one or more microprocessors in conjunction with a DSP core, or any other such configuration. Although described herein primarily with respect to digital technology, the processor may also include primarily analog components. For example, some or all of the signal processing algorithms described herein may be implemented by analog circuitry or mixed analog and digital circuitry. A computing environment may include any type of computer system, including, but not limited to, a computer system that is based on a microprocessor, mainframe computer, a digital signal processor, a portable computing device, a device controller, or a computing engine within the device.

Unless otherwise stated, conditional languages such as "can," "could," "will," "might," or "may" are understood within the context as used in general to convey that certain embodiments include, while other embodiments do not include, certain features, elements and/or steps. Thus, such conditional languages are not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive languages, such as the phrase "at least one of X, Y, or Z," unless specifically stated otherwise, is understood with the context as used in general to present that an item, term, etc., may be either X, Y, or Z, or any combination thereof (e.g., X, Y, and/or Z). Thus, such a disjunctive language is not generally intended to, and should not, imply that certain embodiments require at least one of X, at least one of Y, or at least one of Z to each be present.

Any process descriptions, elements, or blocks in the flow diagrams described herein and/or shown in the accompanying drawings should be understood as potentially representing modules, segments, or parts of code, including one or more executable instructions for implementing a particular logical function or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. The same holds true for the use of definite articles used to introduce embodiment recitations. In addition, even if a specific number of an introduced embodiment recitation is explicitly recited, those skilled in the art will recognize that such recitation should typically be interpreted to mean at least the recited number (e.g., the bare recitation of "two recitations," without other modifiers, typically means at least two recitations, or two or more recitations).

It will be understood by those within the art that, in general, terms used herein, are generally intended as "open" terms (e.g., the term "including" should be interpreted as "including but not limited to," the term "having" should be interpreted as "having at least," the term "includes" should be interpreted as "includes but is not limited to," etc.).

For expository purposes, the term "horizontal" as used herein is defined as a plane parallel to the plane or surface of the floor of the area in which the system being described is used or the method being described is performed, regardless of its orientation. The term "floor" can be interchanged with the term "ground" or "water surface". The term "vertical" refers to a direction perpendicular to the horizontal as just defined. Terms such as "above," "below," "bottom," "top," "side," "higher," "lower," "upper," "over," and "under" are defined with respect to the horizontal plane.

As used herein, the terms "attached," "connected," "coupled," and other such relational terms should be construed, unless otherwise noted, to include removable, moveable, fixed, adjustable, and/or releasable connections or attachments. The connections/attachments can include direct connections and/or connections having intermediate structure between the two components discussed.

Numbers preceded by a term such as "approximately," "about," and "substantially" as used herein include the recited numbers, and also represent an amount close to the stated amount that still performs a desired function or achieves a desired result. For example, the terms "approximately," "about," and "substantially" may refer to an amount that is within less than 10% of the stated amount. Features of embodiments disclosed herein preceded by a term such as "approximately," "about," and "substantially" as used herein represent the feature with some variability that still performs a desired function or achieves a desired result for that feature.

It should be emphasized that many variations and modifications may be made to the above-described embodiments, the elements of which are to be understood as being among other acceptable examples. All such modifications and variations are intended to be included herein within the scope of this disclosure and protected by the following claims.

The invention claimed is:

1. A navigation planning system, comprising:
processing circuitry configured to:
  acquire a planned route indicating a navigation planning route of a movable body on a water;
  acquire movable body information including a position, a moving direction, and a speed of the movable body;
  acquire obstacle information including a position, a moving direction, and a speed of a plurality of obstacles located in a surrounding area of the movable body;
  calculate a collision risk value indicating a risk level of collision between the movable body and one or more of the plurality of obstacles based on the movable body information and the obstacle information for the one or more of the plurality of obstacles;
  determine a necessity of evasion based on the collision risk value;
  calculate a congestion risk value based on a plurality of collision risk values associated with the plurality of obstacles excluding a maximum collision risk value and including a second largest collision risk value among the plurality of collision risk values; and
  set an evasion route different from the planned route in response to the necessity of the evasion being determined,
  wherein the movable body is oriented in a reference direction at an end point of the evasion route.

2. The navigation planning system according to claim 1, wherein the reference direction at the end point of the evasion route is parallel to a direction of the movable body at a position where the movable body begins to deviate from the planned route, or parallel to a direction at a selected point on the planned route.

3. The navigation planning system according to claim 1, wherein the reference direction at the end point of the evasion route is toward a destination from a position where the movable body begins to evade, or toward a selected point on the planned route from the position where the movable body begins to evade.

4. The navigation planning system according to claim 1, wherein the processing circuitry is further configured to:
  generate a plurality of potential evasion route patterns, different from the planned route, between an evasion starting point on the planned route and an end point of the planned route;
  evaluate a collision risk of each said potential evasion route pattern from the plurality of potential evasion route patterns; and
  select a potential evasion route pattern from the plurality of potential evasion route patterns based on the collision risks,
  wherein the selected potential evasion route pattern is the evasion route for the movable body.

5. The navigation planning system according to claim 4, wherein the selected potential evasion route pattern has a minimum collision risk of the collision risks.

6. The navigation planning system according to claim 1, wherein the processing circuitry is further configured to:
  generate a plurality of potential evasion route patterns, different from the planned route, between an evasion starting point on the planned route and an end point of the planned route;
  evaluate a collision risk of each said potential evasion route pattern from the plurality of potential evasion route patterns;
  calculate a distance between the evasion starting point and the end point along each said potential evasion route pattern from the plurality of potential evasion route patterns; and
  select a potential evasion route pattern from the plurality of potential evasion route patterns based on the collision risks and the distance,
  wherein the selected potential evasion route pattern is the evasion route for the movable body.

7. The navigation planning system according to claim 1, wherein the processing circuitry is further configured to:

extract the maximum collision risk obstacle corresponding to a maximum collision risk value from the plurality of obstacles including each said potential evasion route pattern;

select a plurality of the potential evasion route patterns, wherein each said maximum collision risk value of the maximum collision risk obstacle is below a collision risk threshold value; and select a potential evasion route pattern from the selected plurality of potential evasion route patterns based on the collision risk and the distance.

8. The navigation planning system according to claim 1, wherein the congestion risk value indicates a degree of simultaneous approach regarding the plurality of obstacles based on the collision risk value between the movable body and each of the one or more obstacles from the plurality of obstacles, and wherein the processing circuitry is further configured to:

determine the necessity of evasion based on the collision risk value and the congestion risk value.

9. The navigation planning system according to claim 8, wherein the processing circuitry is further configured to:

calculate the congestion risk value based on a logical sum of a plurality of collision risk values associated with the plurality of obstacles.

10. The navigation planning system according to claim 8, wherein the processing circuitry is further configured to:

generate a plurality of potential evasion route patterns, different from the planned route between an evasion starting point on the planned route and an end point of the planned route;

evaluate a collision risk of each said potential evasion route pattern from the plurality of potential evasion route patterns;

evaluate the congestion risk of each said potential evasion route pattern from the plurality of potential evasion route patterns; and select a potential evasion route pattern from the plurality of potential evasion route patterns based on the collision risks and the congestion risk.

11. The navigation planning system according to claim 10, wherein the processing circuitry is further configured to:

extract the maximum collision risk obstacle corresponding to a maximum collision risk value from the plurality of obstacles including each said potential evasion route pattern;

select a plurality of the potential evasion route patterns, wherein each said maximum collision risk value of the maximum collision risk obstacle is below a collision risk threshold value; and select a potential evasion route pattern from the selected plurality of potential evasion route patterns based on the collision risk and the congestion risk.

12. The navigation planning system according to claim 10, wherein the processing circuitry is further configured to:

extract the maximum collision risk obstacle corresponding to a maximum collision risk value from the plurality of obstacles including each said potential evasion route pattern; and select a plurality of the potential evasion route patterns, wherein each said maximum collision risk value of the maximum collision risk obstacle is below a collision risk threshold value;

calculate the distance between the evasion starting point and the end point along each said potential evasion route; and select a potential evasion route pattern from the plurality of potential evasion route patterns based on the collision risks, the congestion risk, and the distance, wherein the selected potential evasion route pattern is the evasion route for the movable body.

13. The navigation planning system according to claim 8, wherein the processing circuitry is configured to:

release a restriction on the direction of the end point of the evasion route and set a new evasion route having the collision risk value below a collision risk threshold value and the congestion risk value below a congestion risk threshold value, under a condition where there is no evasion route having the collision risk value below the collision risk threshold value and the congestion risk value below the congestion risk threshold value.

14. The navigation planning system according to claim 8, wherein the processing circuitry is configured to:

select the evasion route from the plurality of potential evasion route patterns in which a distance traveled by the movable body is minimum among the plurality of potential evasion route patterns having the collision risk value below the collision risk threshold value and the congestion risk value below the congestion risk threshold value.

15. The navigation planning system according to claim 1, wherein the processing circuitry is configured to:

periodically acquire the movable body information;

periodically acquire the obstacle information;

periodically calculate the collision risk value;

periodically determine the necessity of the evasion; and periodically set the evasion route in response to the necessity of the evasion being determined.

16. A navigation planning method, comprising:

acquiring a planned route indicating a navigation planning route of a movable body on a water;

acquiring movable body information including a position, a moving direction, and a speed of the movable body;

acquiring obstacle information including a position, a moving direction, and a speed of a plurality of obstacles located in a surrounding area of the movable body;

calculating a collision risk value indicating a risk level of collision between the movable body and one or more of the plurality of obstacles based on the movable body information and the obstacle information for the one or more of the plurality of obstacles;

determining a necessity of evasion based on the collision risk value;

calculating a congestion risk value based on a plurality of collision risk values associated with the plurality of obstacles excluding a maximum collision risk value and including a second largest collision risk value among the plurality of collision risk values; and setting an evasion route different from the planned route in response to the necessity of the evasion being determined, wherein the movable body is oriented in a reference direction at an end point of the evasion route.

17. The navigation planning method according to claim 16, wherein the reference direction at the end point of the evasion route is parallel to a direction of the movable body at a position where the movable body begins to deviate from the planned route, parallel to a direction at a selected point on the planned route, toward a destination from the position where the movable body begins to evade, or toward the selected point on the planned route from the position where the movable body begins to evade.

18. The navigation planning method according to claim 16, further comprising:

generating a plurality of potential evasion route patterns, different from the planned route, between an evasion starting point on the planned route and an end point out of the planned route;

evaluating a collision risk of each said potential evasion route pattern from the plurality of potential evasion route patterns; and selecting a potential evasion route pattern from the plurality of potential evasion route patterns based on the collision risks, wherein the selected potential evasion route pattern is the evasion route for the movable body.

19. A non-transitory computer readable medium having stored thereon computer-executable instructions which, when executed by a computer, cause the computer to:

acquire a planned route indicating a navigation planning route of a movable body on a water;

acquire movable body information including a position, a moving direction, and a speed of the movable body;

acquire obstacle information including a position, a moving direction, and a speed of a plurality of obstacles located in a surrounding area of the movable body;

calculate a collision risk value indicating a risk level of collision between the movable body and one or more of the plurality of obstacles from the plurality of obstacles based on the movable body information and the obstacle information for the one or more of the plurality of obstacles;

determine a necessity of evasion based on comparing the collision risk value with a threshold value;

calculate a congestion risk value based on a plurality of collision risk values associated with the plurality of obstacles excluding a maximum collision risk value and including a second largest collision risk value among the plurality of collision risk values; and set an evasion route different from the planned route in response to the necessity of the evasion having been determined, wherein the movable body is oriented in a reference direction at an end point of the evasion route.

* * * * *